US012597755B2

(12) United States Patent
Shoman et al.

(10) Patent No.: US 12,597,755 B2
(45) Date of Patent: Apr. 7, 2026

(54) ELECTRONICALLY-CONTROLLED OPTICAL FEEDBACK METHODS FOR LASER LINEWIDTH

(71) Applicant: The University of British Columbia, Vancouver (CA)

(72) Inventors: Hossam Ahmed Sabri Shoman, Vancouver (CA); Sudip Shekhar, Vancouver (CA); Lukas Chrostowski, Vancouver (CA); Omid Esmaeeli, Vancouver (CA)

(73) Assignee: The University of British Columbia, Vancouver (CA)

( * ) Notice: Subject to any disclaimer, the term of this patent is extended or adjusted under 35 U.S.C. 154(b) by 841 days.

(21) Appl. No.: 17/969,646

(22) Filed: Oct. 19, 2022

(65) Prior Publication Data

US 2023/0163556 A1     May 25, 2023

Related U.S. Application Data

(63) Continuation of application No. PCT/CA2021/000047, filed on May 13, 2021.

(Continued)

(51) Int. Cl.
*H01S 3/13*        (2006.01)
*H01S 3/086*       (2006.01)
*H01S 3/106*       (2006.01)

(52) U.S. Cl.
CPC ........... *H01S 3/1305* (2013.01); *H01S 3/086* (2013.01); *H01S 3/1062* (2013.01)

(58) Field of Classification Search
CPC ....... H01S 3/1305; H01S 3/086; H01S 3/1062

(Continued)

(56) References Cited

U.S. PATENT DOCUMENTS 4,907,237 A * 3/1990 Dahmani .............. H01S 5/0656
                                                        372/18
7,848,370 B2 12/2010 Kewitsch et al.
(Continued)

FOREIGN PATENT DOCUMENTS

EP          2332010 B1     5/2019
WO      2020124270 A1     6/2020

OTHER PUBLICATIONS

Written Opinion in PCT/CA2021/000047 dated Sep. 28, 2021.*

(Continued)

*Primary Examiner* — Daniel A Hess
(74) *Attorney, Agent, or Firm* — Todd A. Rattray; Oyen Wiggs Green & Mutala LLP

(57)              ABSTRACT

An integrated optical linewidth reduction system based on optical feedback and a low-speed electronic control loop to control the optical feedback. Light is tapped and reflected back to the laser with an amplitude, phase or both amplitude and phase adjustment such that the linewidth of the laser is lower than the free-running laser linewidth. The amplitude of the feedback signal may be controlled using an optical attenuator. The phase of the feedback signal may be controlled using a phase shifter. The amplitude of the optical feedback may be monitored by means of a filter and a photodetector, or just a photodetector. The amplitude and/or phase of the optical feedback is monitored by means of a frequency/phase noise discriminator. The phase shifter can be an endless phase shifter.

18 Claims, 19 Drawing Sheets

Related U.S. Application Data

(60) Provisional application No. 63/024,118, filed on May 13, 2020.

(58) Field of Classification Search
USPC .......................................................... 359/334
See application file for complete search history.

(56) References Cited

U.S. PATENT DOCUMENTS

| | | | |
|---|---|---|---|
| 8,804,787 | B1 | 8/2014 | Coleman et al. |
| 9,250,453 | B2 | 2/2016 | Aflatouni et al. |
| 9,482,886 | B2 | 11/2016 | Aflatouni et al. |
| 10,224,694 | B2 | 3/2019 | Wei et al. |
| 2013/0044974 | A1 | 2/2013 | Doerr |
| 2013/0322807 | A1 | 12/2013 | Aflatouni et al. |
| 2014/0140652 | A1 | 5/2014 | Aflatouni et al. |
| 2022/0131342 | A1* | 4/2022 | Van Rees ................ H01S 3/106 |

OTHER PUBLICATIONS

Schnuck et al., "Numerical analysis of the feedback regimes for a single-mode semiconductor laser with external feedback", IEEE Journal of Quantum Electronics, vol. 24, No. 7, Jul. 1988, pp. 1242-1247.
Camatel et al., "Narrow Linewidth CW Laser Phase Noise Characterization Methods for Coherent Transmission System Applications", Journal of Lightwave Technology, vol. 26, No. 17, Sep. 1, 2008, pp. 3048-3055.
Rubiola et al., "Correlation-based phase noise measurements", Review of Scientific Instruments, vol. 71, No. 8, pp. 3085-3091, Aug. 2000.
M. Ohtsu et al., Linewidth reduction of a semiconductor laser by electrical feedback. Journal of Quantum Electronics (1985).
E. D. Black, An introduction to Pound-Drever-Hall laser frequency stabilization. American Journal of Physics (2001).
M. Idjadi et al., Integrated Pound-Drever-Hall laser stabilization system in silicon. Nature Communication (2017).
A. Sivananthan et al. Integrated linewidth reduciton of a tunable SG-DBR laser. In Lasers and Electro-Optics, 2013. CLEO 2013. Conference on (IEEE, 2013).
B. Dahmani et al., Frequency stabilization of semi-conductor lasers by resonant optical feedback. Opt. Lett. 12, 876-878 (1987).
K. Aoyama et al., Optical negative feedback for linewidth reduction of semiconductor lasers. IEEE Photonics Technology Letters 27, 340-343 (2015).
B. Song et al., Noise reduction of integrated laser source with on-chip optical feedback. In Asia Communications and Photonics Conference, M1D.5 (Optical Society of America, 2017).
Shin, C.-H. & Ohtsu, M. Stable semiconductor laser with a 7-Hz linewidth by an optical-electrical double-feedback technique. Opt. Lett. 15, 1455-1457 (1990).
F. Aflatouni et al., Design methodology and architectures to reduce the semiconductor laser phase noise using electrical feedforward schemes. IEEE Transactions on Microwave Theory and Techniques 58, 3290-3303 (2010).

* cited by examiner

ELECTRONICALLY-CONTROLLED OPTICAL FEEDBACK METHODS FOR LASER LINEWIDTH

CROSS-REFERENCE TO RELATED APPLICATIONS

This application is a continuation of Patent Cooperation Treaty (PCT) application No. PCT/CA2021/000047 filed 13 May 2021, which in turn claims priority from, and for the purpose of the United States of America the benefit under 35 U.S.C. § 119 in connection with, U.S. application No. 63/024,118 filed 13 May 2020. All of the applications referred to in this paragraph are hereby incorporated herein by reference.

FIELD

The present invention relates to methods and apparatus for producing narrow linewidth coherent light.

BACKGROUND

Lasers which emit light with a narrow linewidth (sub-kHz) are important in several applications. Some of these applications include spectroscopy, coherent optical communication systems, sensing, microwave photonics, LiDARs and optical phase arrays, high resolution spectroscopy, THz signal generation, etc.

Existing methods to narrow the linewidth of a laser include electro-optical phase locked loops, electrical feedback, optical feedback, electrical-and-optical double feedback, and linewidth reduction filters. However, such methods may suffer from various drawbacks, including need for multiple lasers, bulky assembly, high optical losses, high-speed electronic control, or a combination of these.

In electro-optical phase locked loops, a broad linewidth tunable laser is locked to a narrow linewidth fixed wavelength reference laser using a phase locked loop (PLL). Due to large feedback gain, within the bandwidth of the loop, the linewidth of the laser is heavily suppressed, and follows the reference laser's linewidth. The overall performance is dependent on the characteristics of the main laser, reference laser, and limited by loop bandwidth. Since two lasers are needed, this technique is not ideal for many applications.

In some electrical feedback techniques, the frequency (phase) noise of a laser is extracted by an interferometer, cavity or resonator operating on a portion of the laser output, and fed back to the laser as an electronic signal controlling the laser bias. The feedback action suppresses the linewidth within the loop bandwidth. See for example Ohtsu, M. & Kotajima, S. "Linewidth reduction of a semiconductor laser by electrical feedback", *Journal of Quantum Electronics* (1985); Black, E. D. "An introduction to Pound-Drever-Hall laser frequency stabilization", *American Journal of Physics* (2001); Idjadi, M. & Aflatouni, F. "Integrated Pound-Drever-Hall laser stabilization system in silicon", *Nature Communication* (2017); Sivananthan, A. et al. "Integrated linewidth reduction of a tunable SG-DBR laser", in *Lasers and Electro-Optics, 2013. CLEO 2013. Conference on* (IEEE, 2013). The overall performance of this technique depends on the characteristics of the laser and is limited by loop bandwidth. This technique requires access to the laser bias circuit.

Optical feedback techniques rely on the fact that lasers are highly sensitive to optical feedback. Performance of these techniques depends on the characteristics of the laser and is limited by feedback dynamics. A large reflection can even lead to frequency and amplitude instability. Discrete setups are sensitive to vibrations.

NIKOLAUS SCHUNK, MEMBER, IEEE, AND KLAUS PETERMANN, Numerical Analysis of the Feedback Regimes for a Single-Mode Semiconductor Laser with External Feedback, IEEE JOURNAL OF QUANTUM ELECTRONICS, VOL 24, NO 7, July 1988 which is hereby incorporated herein by reference describes a theoretical framework for determining the effect of optical feedback on linewidth of a laser.

Dahmani, B., Hollberg, L. & Drullinger, R. "Frequency stabilization of semiconductor lasers by resonant optical feedback", *Opt. Lett.* 12, 876-878 (1987) applies optical feedback using an appropriate optical geometry to self-lock a laser to a separate Fabry-Perot reference cavity for both frequency stabilization and linewidth reduction. Aoyama, K., Yoshioka, R., Yokota, N., Kobayashi, W. & Yasaka, H. "Optical negative feedback for linewidth reduction of semi-conductor lasers", *IEEE Photonics Technology Letters* 27, 340-343 (2015) applies a lens and a Fabry-Perot Etalon (interferometer) as an optical filter.

Song, B. et al. "Noise reduction of integrated laser source with on-chip optical feedback" in *Asia Communications and Photonics Conference*, M1D.5 (Optical Society of America, 2017) describes distributed Bragg grating (DBR) reflection in an integrated InP platform.

Electrical-and-optical double-feedback techniques simultaneously use the optical feedback from an external cavity and electrical negative feedback from the reflection mode of a high-finesse stable optical cavity. See for example Shin, C.-H & Ohtsu, M. "Stable semiconductor laser with a 7-Hz linewidth by an optical-electrical double-feedback technique", *Opt. Lett.* 15, 1455-1457 (1990). The drawbacks are similar to the electrical and optical feedback techniques mentioned above.

Linewidth reduction filters may be used to reduce linewidth of a light beam. Unlike feedback schemes, in which the laser source is a part of the feedback, the linewidth filter's operation does not depend on the laser source and in principle, can be placed after a light source to reduce its linewidth. A linewidth reduction filter can be implemented as feedforward or feedback filter. A feedforward filter has no feedback whatsoever. Linewidth reduction bandwidth is large due to lack of feedback loops. The phase noise of the laser is extracted on a portion of the laser signal, and then the phase noise itself is used to modulate the laser signal to get rid of the phase noise ideally. See for example Aflatouni, F., M. & Hashemi, H. "Design methodology and architectures to reduce the semiconductor laser phase noise using electrical feedforward schemes", *IEEE Transactions on Microwave Theory and Techniques* 58, 3290-3303 (2010). However, linewidth reduction performance is limited by the gain and delay mismatch between the top and bottom paths of the feedforward loop. The optical phase modulator (OPM) has significant insertion loss, and degrades the efficiency and output power of the laser. Moreover, nonidealities associated with the standalone phase/frequency modulator (e.g. finite modulation range) can limit the effectiveness of the scheme. See for example U.S. Pat. No. 9,482,886, Aflatouni et al. "Integrated light source independent linewidth reduction".

A feedback technique still keeps the laser out of the loop. The phase noise of the laser is extracted on a portion of the final laser output signal, and then the phase noise itself is used to modulate the laser input signal to suppress the phase noise. The corresponding linewidth reduction bandwidth is limited due to feedback loop. The OPM is large, has significant insertion loss, and degrades the efficiency and output power of the laser. See for example U.S. Pat. No. 9,250,453, Aflatouni et al. "Integrated light source independent linewidth reduction of lasers using electro-optical feedback techniques".

Phase shifters are used in various photonic circuits. If a large range of phase shift is required, a phase shifter may require an electronic driver with a large voltage swing. Designing a suitable driver is often a challenge. Also, a driver that provides a large voltage swing often has an undesirably large power consumption. U.S. Pat. No. 8,787,708, Doerr "Endless phase shifting" describes an endless phase shifter that overcomes some of these limitations. However, the endless phase shifter is a two port device that requires two Mach-Zehnder Interferometer switches for a line phase shifter, requiring multiple electronic drivers and an undesirably large footprint. To operate the endless phase shifter over a large phase shift (e.g. of $4\pi$), the two switches must be simultaneously switched. If the switches are mis-synchronized, the overall magnitude and phase response is erroneous.

The inventors have recognized a need for alternative ways to produce narrow linewidth light which avoid at least some of the above mentioned shortcomings.

SUMMARY

This invention has a number of aspects including:
Low linewidth light sources;
Methods for generating low linewidth light;
endless optical phase shifters; and
Methods for controlling lasers.

Some embodiments of the invention provide methods for producing narrow-linewidth optical radiation that comprise operating a light source such as a laser and reducing a linewidth of the laser by optical feedback with electronic control. The optical feedback may be provided by an integrated photonic circuit. Such methods may be implemented without high-speed electronic control. Such methods may be practiced without causing significant optical losses.

In various embodiments one or both of the phase and amplitude of the optical feedback is controlled. Some embodiments apply a single-port endless phase shift mechanism to control phase of the optical feedback.

One aspect of the present invention provides apparatus and methods in which a splitter/combiner taps a portion of an incoming laser beam. The amplitude of the tapped portion is attenuated and reflected back to the splitter/combiner. The splitter/combiner sends the reflected portion back to the laser as optical feedback. The phase, amplitude and delay of the feedback signal may be conditioned until the linewidth of the laser is minimized.

Optical linewidth of the laser may be monitored by monitoring the amplitude and phase of the feedback signal relative to the amplitude and phase of the signal exiting the laser using optical filters and a low-speed electronic control system. Some embodiments apply a phase shift mechanism that permits endless phase conditioning without large power penalty or complicated electronic drivers.

One aspect of the present invention provides a coherent light source comprising a coherent light emitter operable to emit a beam of coherent light, an optical feedback system comprising an integrated photonic circuit operative to redirect a fraction of the light of the beam of coherent light back into the coherent light emitter as an optical feedback signal, and an electronic control operative to set an amplitude and/or a phase of the redirected fraction of the light.

In some embodiments, the integrated photonic circuit of the coherent light source comprises an optical attenuator and an attenuation provided by the optical attenuator is controlled by the electronic control. In some embodiments, the optical attenuator comprises a Mach-Zehnder interferometer (MZI). In other embodiments, the optical attenuator comprises a p, i, n diode.

In some embodiments, the integrated photonic circuit of the coherent light source further comprises a reflector. In some embodiments, the reflector comprises a Bragg grating. In other embodiments, the reflector comprises a beam splitter and a waveguide loop. In yet other embodiments, the reflector comprises a microring resonator.

In some embodiments, the optical feedback system of the coherent light source comprises a splitter/combiner connected to receive the beam of coherent light from the light emitter, tap a portion of the beam of coherent light, deliver a remainder of the beam of light to an output port, and receive and redirect into the coherent light emitter the fraction of the light. In some embodiments, the splitter/combiner is a variable splitter combiner and the electronic control is operative to vary the portion of the beam of light tapped by the splitter/combiner.

In some embodiments, the coherent light source further comprises a variable optical phase shifter between the splitter combiner and the coherent light emitter, the variable optical phase shifter operative to apply a selected phase shift to the redirected fraction of the light wherein the selected phase shift is controlled by the electronic control.

In some embodiments, the integrated photonic system of the coherent light source comprises an optical phase shifter operative to apply a selected phase shift to the redirected fraction of the light wherein the selected phase shift is controlled by the electronic control. In some embodiments, the optical phase shifter has a range of at least 47 radians.

In some embodiments, the optical phase shifter comprises an optical switch switchable between a first state where light presented at an input/output port is directed to a first port with a first phase delay and a second state where light presented at the input port is directed to a second port with a second phase delay, and optics comprising a variable line phase shifter connected between the first and second ports.

In some embodiments, the optical phase shifter comprises a first optical coupler connecting the input/output port and the switch, a second 2×2 ports coupler connecting the switch and a line phase shifter section containing the line phase shifter and a third 2×2 ports coupler connecting the line phase shifter section and a waveguide loop. In some embodiments, the first optical coupler is a 1×2 ports coupler. In other embodiments, the first optical coupler is a 2×2 ports coupler, the phase shifter comprises a photodetector connected to a port of the first optical coupler, and the electronic control is connected to monitor an output signal of the photodetector.

In some embodiments, the optical switch comprises first and second phase shifters controlled by the electronic control and the electronic control is configured to control the first and second phase shifters to switch the switch between the first and second states. The electronic control may be configured to adjust the first and second phase shifters to minimize the photocurrent at the photodetector.

In some embodiments, in the first state the first phase shifter provides a phase shift of 0 and the second phase shifter provides phase shift of $\pi$ radians and in the second state the first phase shifter provides a phase shift of $\pi/2$ radians and the second phase shifter provides phase shift of $\pi/2$ radians.

In some embodiments, the coherent light source further comprises a photosensor coupled to measure an amplitude of the optical feedback signal.

In some embodiments, the electronic control stores a desired amplitude for the optical feedback signal and is configured to control the integrated photonic circuit to cause the amplitude of the optical feedback signal to equal the desired amplitude for the optical feedback signal.

In some embodiments, the coherent light source further comprises an optical filter connected to pass optical power in one or more sidebands of a spectrum of the coherent light to a photosensor wherein the electronic control is connected to receive an output signal from the photosensor that provides a measure of the optical power in the one or more sidebands of the spectrum of the coherent light. In some embodiments, the electronic control is configured to adjust the phase and/or amplitude of the optical feedback signal to minimize the optical power in the one or more sidebands of the spectrum of the coherent light.

In some embodiments, the coherent light source further comprises a frequency/phase noise discriminator operable to measure optical phase fluctuations in the coherent light beam wherein the electronic control is configured to control the amplitude and/or the phase of the optical feedback signal to minimize the optical phase fluctuations.

In some embodiments, the coherent light source further comprises a multi-wavelength laser. In some embodiments, the coherent light emitter comprises a semiconductor diode laser.

Another aspect of the invention provides a linewidth reduction method, comprising: operating a light emitter to issue a beam of coherent light; tapping a portion of the beam of coherent light; redirecting some or all of the tapped portion of the beam of coherent light back into the light emitter as an optical feedback signal; and by an electronic control, setting an amplitude and/or a phase of the optical feedback signal to reduce a spectral linewidth of the beam of coherent light.

In some embodiments the method comprises setting the amplitude of the optical feedback signal by attenuating the tapped portion of the beam of coherent light.

In some embodiments the method comprises setting the amplitude of the optical feedback signal at least in part by adjusting a ratio of the tapped portion of the beam of coherent light.

In some embodiments the method comprises setting the amplitude of the optical feedback signal at least in part by adjusting a reflectivity of a reflector in an optical path of the tapped light.

In some embodiments the method comprises monitoring the amplitude of the optical feedback signal.

In some embodiments the method comprises by the electronic control, controlling the amplitude of the optical feedback signal by feedback control using the monitored amplitude of the optical feedback signal.

In some embodiments the method comprises monitoring a spectral linewidth of the beam of coherent light.

In some embodiments the method comprises monitoring the spectral linewidth comprises monitoring optical power in sidebands of the beam of coherent light.

In some embodiments monitoring the optical power in sidebands of the beam of coherent light comprises filtering light from the tapped portion of the beam of coherent light and monitoring an intensity of the filtered light.

In some embodiments the method comprises, by the electronic control, controlling the amplitude of the optical feedback signal by feedback control using the monitored spectral linewidth of the beam of coherent light.

In some embodiments the method comprises setting the phase of the optical feedback signal by adjusting a phase shifter in an optical path of the tapped portion of the beam of coherent light.

In some embodiments the method comprises monitoring frequency/phase noise of the beam of coherent light.

In some embodiments the phase shifter comprises a reflection endless phase shifter operable to endlessly change the phase of the optical feedback signal.

In some embodiments the method comprises, by the electronic control, controlling the phase of the optical feedback signal by feedback control using the monitored frequency/phase noise.

In some embodiments the method comprises isolating the light emitter from remote reflections.

In some embodiments the method comprises delivering the beam of coherent light by an optical fiber to an integrated photonic circuit comprising a beam splitter/combiner configured to perform the tapping.

In some embodiments the integrated photonic circuit comprises a reflector and one or more of an attenuator and a phase shifter in an optical path between the splitter combiner and the reflector.

Another aspect of the invention provides linewidth reduction methods. In one embodiment, the linewidth reduction method comprises tapping a portion of the laser output power and attenuating the tapped signal and directing it back to the laser using an electronic control. In another embodiment, the linewidth reduction method further comprises monitoring the amplitude of the feedback signal using an electronic control.

In another embodiment, the linewidth reduction method comprises tapping a portion of the laser output power, attenuating the tapped signal and directing it back to the laser using an electronic control, adjusting the phase of the feedback signal using an electronic control, and monitoring the frequency/phase noise of the laser.

In another embodiment, the linewidth reduction method comprises an amplitude control system that adjusts the amplitude of the feedback signal using an electronic control, adjusting the phase of the feedback signal using an electronic control, and monitoring the frequency/phase noise of the laser.

In other embodiments, the above linewidth reduction methods further comprise an isolator to protect the laser from undesirable/remote reflections. In some embodiments, the above linewidth reduction methods further comprise an optical fiber following the laser.

In some embodiments, the linewidth reduction methods comprise a splitter/combiner, an optical attenuator, an optical reflector, a photodetector/s, an electronic control system/s, and a phase shifter. In some embodiments, the tapping is performed using an optical splitter that also acts as an optical combiner.

In some embodiments, the splitter is a 1×N port device, or N×N ports device, based on the number of taps required. In some embodiments, the tapped signal magnitude is attenuated before directing it back to the laser such that this directed signal results in a low amplitude of feedback signal going back to the laser.

In some embodiments, the linewidth reduction method further comprises a photodetector, wherein the magnitude of the feedback signal is monitored. A control circuit may adjust the attenuation level such that the feedback signal going to the laser results in a reduced laser linewidth. The photodetector block can comprise multiple photodetectors, located elsewhere in the optical circuit to provide a means of the required feedback ratio for a reduced laser linewidth.

In some embodiments, the linewidth reduction methods comprise a filter and a photodetector, wherein the optical power in the tapped signal sidebands is measured by the photodetector. A control circuit may adjust the attenuation level such that the feedback signal going to the laser results in a reduced laser linewidth.

In some embodiments, the linewidth reduction method comprises a frequency/phase noise discriminator to measure the laser frequency/phase noise. A control circuit may adjust the attenuation level such that the feedback signal going to the laser results in a reduced laser linewidth.

In some embodiments, the linewidth reduction method further comprises a frequency/phase noise discriminator to measure the laser frequency/phase noise. A control circuit may adjust the phase of the feedback signal such that the laser output has the smallest linewidth.

In some embodiments, the linewidth reduction method comprises a filter and a photodetector, wherein the optical power in the tapped signal sidebands is measured by the photodetector, and a frequency/phase noise discriminator to measure the laser frequency/phase noise. A control circuit may adjust the attenuation level such that the feedback signal going to the laser results in a reduced laser linewidth, and another control circuit adjusts the phase of the feedback signal such that the laser output has the smallest linewidth.

In some embodiments, the linewidth reduction method comprises a frequency/phase noise discriminator to measure the laser frequency/phase noise. A control circuit may adjust the both the amplitude and phase of the feedback signal such that the laser output has the smallest linewidth.

In some embodiments, the linewidth reduction method comprises a phase shifter, an optical splitter, frequency/phase noise discriminator, and electronic control system(s).

In some embodiments, the amplitude of the feed-back signal is adjusted using an amplitude control system. The amplitude control system comprises a tunable splitter/combiner, optical attenuator, photodetector(s), phase shifter(s), optical reflector, electronic control system(s). The amplitude control system is used to tap a certain power necessary to stabilize the laser, using the tunable splitter/combiner.

In some embodiments, an optical splitter taps a portion of the laser output power to a frequency/phase noise discriminator to measure the laser frequency/phase noise. A control circuit may adjust the amplitude of the feedback signal using the tunable splitter/combiner, and/or the phase shift of feedback signal to the laser using the phase shifter, such that the optical feedback signal going to the laser results in a reduced laser linewidth.

In some embodiments, the linewidth reduction method applies a filter following an optical splitter, wherein the portion of the laser output power is tapped, and the optical power in the tapped signal sidebands is measured by the photodetector following the filter. A control circuit may adjust the tunable splitter/combiner such that the feedback signal going to the laser results in a reduced laser linewidth.

In some embodiments, the linewidth reduction method comprises a control loop including monitoring photodetector(s), filter(s), and electronic control are used to ensure the line phase shifter and switch operate at a desired phase point.

Another aspect of the invention provides endless phase shifters. Such phase shifters may be applied in linewidth control systems and in other applications.

In some embodiments, a single-port reflection endless phase shifter comprises three phase shifters, two for switching and one in the line phase shifter. At least one of the waveguides in the line phase shifter have phase shifting capabilities. The relative phase of the top and bottom arms in the switch is set to either $\pi/2$ or $-\pi/2$, and the phase of the line phase shifter can change between 0 and $2\pi$.

In some embodiments, a two-port reflection endless phase shifter comprises of three phase shifters, two for switching and one in the line phase shifter. At least one of the waveguides in the line phase shifter have phase shifting capabilities. The relative phase of the top and bottom arms in the switch is set to either $\pi$ or 0, and the phase of the line phase shifter can change between 0 and $2\pi$.

Other aspects of the invention provide apparatus and/or methods having any new and inventive feature, combination of features, or sub-combination of features as described herein.

In some embodiments light sources that offer high performance (narrow spectral linewidth (e.g. on the order of kHz) are provided by combining a relatively inexpensive solid state laser which has a relatively large spectral linewidth (e.g. on the order of 100's of kHz or MHz) by connecting the light output from the laser to an integrated photonic circuit chip that implements a linewidth reduction system according to any of the embodiments described herein. The lser may e connected to the integrated photonic chip by an optical fiber having a length sufficient to ensure a desired delay.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Some embodiments of the present technology provide linewidth reduction apparatus operable to reduce the linewidth of a laser or other coherent optical emitter. Some embodiments of the invention provide narrow linewidth optical sources that combine a laser or other emitter of coherent optical radiation with a linewidth reduction apparatus.

The linewidth reduction apparatus operates by redirecting a fraction of a beam of coherent light emitted by a laser or other coherent light emitter back into the light emitter as an optical feedback signal. The amplitude and/or phase of the optical feedback signal are controlled to reduce an optical linewidth of the beam of coherent light.

In some embodiments a calibration is performed by varying the phase and/or amplitude of the optical feedback signal while monitoring the linewidth of the emitted beam of coherent light. The phase and/or amplitude that minimize the linewidth or reduce the linewidth to a desired value may be recorded. An electronic control may be configured to deliver the optical feedback signal with the calibrated phase and/or amplitude to reduce the linewidth of the beam of coherent light.

In some embodiments the calibration is performed for different operating conditions of the light emitter. For example, the calibration may be performed for one or more of: different optical power levels of the light emitter and/or different operating temperatures. In operation an electronic control may determine the current operating conditions of the light emitter (e.g. measuring a temperature using one or more temperature sensors and/or measuring an optical power level of the light emitter using a suitable light detector and/or based on control inputs to the light emitter) and the electronic control may access a calibrated phase and/or amplitude corresponding to the operating conditions and then deliver the optical feedback signal with the calibrated phase and/or amplitude to reduce the linewidth of the beam of coherent light.

Figure 1:
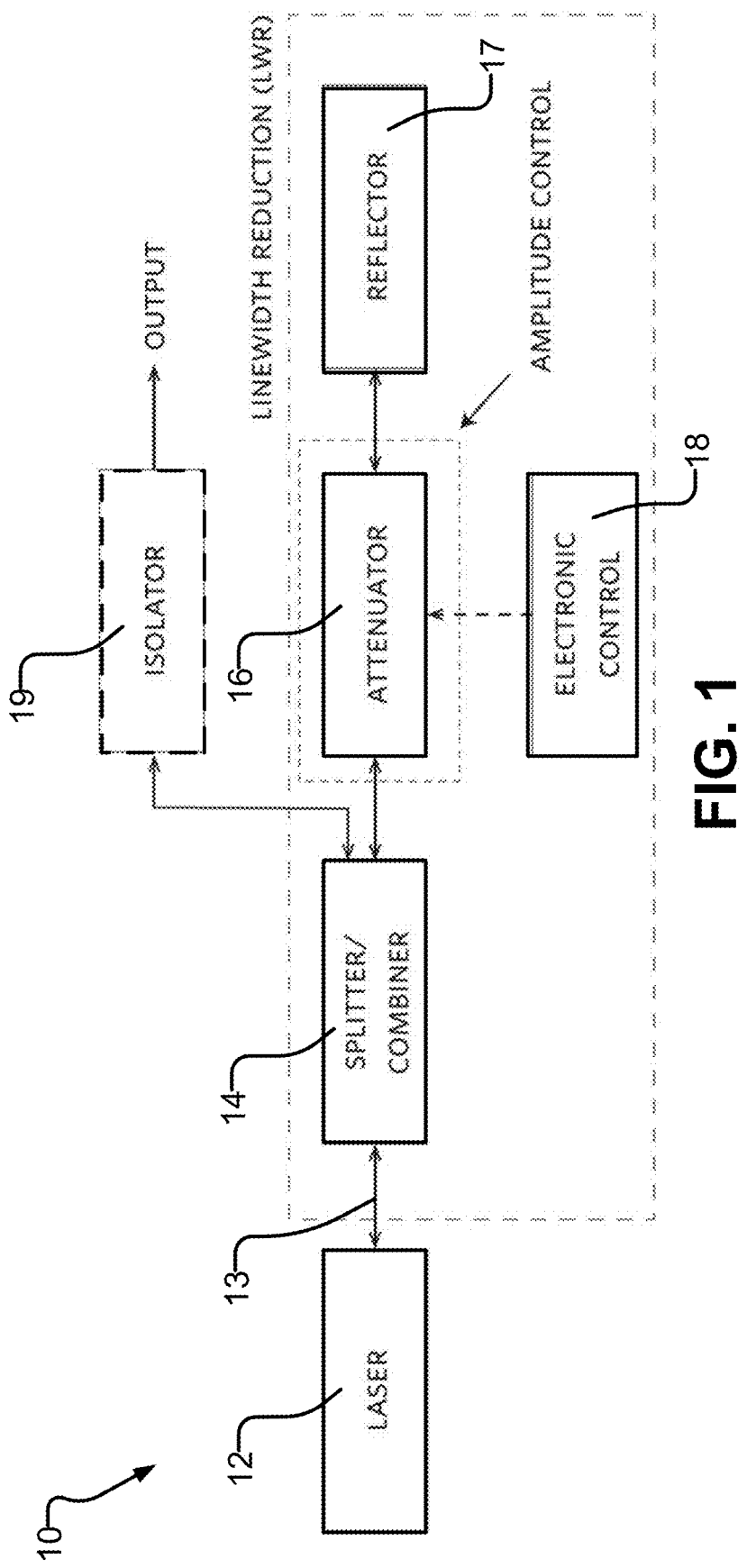
FIG. 1 is a block diagram of an electronically-controlled linewidth reduction system based on optical feedback, with amplitude control of the optical feedback according to an embodiment of the present invention.

FIG. 1 is a block diagram illustrating a light source 10 that includes a linewidth reduction system according to a simple example embodiment of the present invention. In FIG. 1 and other figures, solid black connecting lines represent optical signals and dotted black connecting lines represent electrical signals.

Light source 10 includes a light emitter 12 that is operable to emit a light beam 13. Any light emitter 12 with a high degree of coherence (e.g. a laser or suitable light emitting diode (LED) or superluminescent LED) can be used to generate light beam 13. Optical waveguides guide light beam 13.

A splitter/combiner 14 taps a fraction of the light of light beam 13. Splitter/combiner 14 may, for example, comprise a multi-port device, such as a directional coupler based on optical waveguides, multi-mode interference couplers, or others. Splitter/combiner 14 splits the incoming beam with a selected power splitting ratio that is sufficient to yield an optical feedback signal with sufficient amplitude to reduce the linewidth of light emitter 12. In some embodiments, only a small fraction of the original light of beam 13 is diverted by splitter/combiner 14 and reflected back to provide an optical feedback signal to light emitter 12.

Light source 10 includes an optical attenuator 16 that is operable to controllably attenuate light tapped by splitter/combiner 14. The amplitude of the optical feedback signal may be adjusted by modulating the attenuation provided by optical attenuator 16.

Optical attenuator 16 may, for example, be based on a Mach-Zehnder interferometer (MZI) or a p, i, n diode, or any other practical device that can controllably attenuate the tapped light.

The tapped signal is reflected back toward light emitter 12 by a reflector 17. Reflector 17 may, for example, comprise a Bragg grating, a splitter and a waveguide loop, a microring resonator, or any other device(s) that can reflect light with a high degree of reflectance.

In light source 10 as well as other embodiments described herein, optical components of the linewidth reduction system such as all or some of splitter/combiner 14, optical attenuator 16 and reflector 17 may be provided by an integrated photonic circuit.

The reflected signal is combined by splitter/combiner 14 to provide the optical feedback signal that is delivered back to light emitter 12.

An optical isolator 19 is optionally provided in series with the output of light source 10. A light source according to any embodiment described herein may include an optical isolator 19. Optical isolator 19, if present, may to protect light emitter 12 from remote reflections. Remote reflections may, for example originate from on-chip devices, or an optical fiber.

Light source 10 and other embodiments of the present technology incorporate an electronic control which is configured to set the phase and/or amplitude of the optical feedback signal. In light source 10, electronic control 18 actuates attenuator 16 to provide an optical feedback signal that has an amplitude that is selected to provide a reduced linewidth of beam 13. For example, electronic control 18 may be hard wired to deliver an optical feedback signal that has an appropriate amplitude or may be configured to acquire a calibration value (which may, for example comprise a calibration drive signal for attenuator 16 or a calibration amplitude for the optical feedback signal) from a data store, memory or the like and to control attenuator 16 to deliver an optical feedback signal based on the calibration value.

A distance between light emitter 12 and reflector 17 that reflects the optical feedback signal is sufficient to provide a delay, τ so that the argument of the cosine term in the equation:

$$\Delta v = \Delta v_0 [1 + C \cos(\omega \tau = \arctan \alpha)]^{-2}$$

is 1, where α is a linewidth enhancement factor which is a property of light emitter 12 A suitably large delay may be ensured by providing a sufficient length of optical fiber to carry light beam 13 to an integrated photonic chip that carries reflector 17 and other components of the linewidth reduction system. In some embodiments an integrated photonic circuit chip comprised an extended low loss optical waveguide (e.g. made of lithium niobate) that provides a sufficient delay.

The construction of light source 10 may be varied in several ways while preserving the functionality as described above. For example, in addition to or instead of controlling the amplitude of the optical feedback signal by adjusting optical attenuator 16, electronic control 18 may adjust the amplitude of the optical feedback signal by varying the reflectivity of reflector 17 and/or varying the splitting ratio of splitter/combiner 14.

In some embodiments (various examples are provided below), electronic control 18 comprises a feedback controller. In the following drawings, elements identified by reference numbers that are also used in other figures are the same as or similar to the corresponding elements shown in the other figures.

Figure 2:
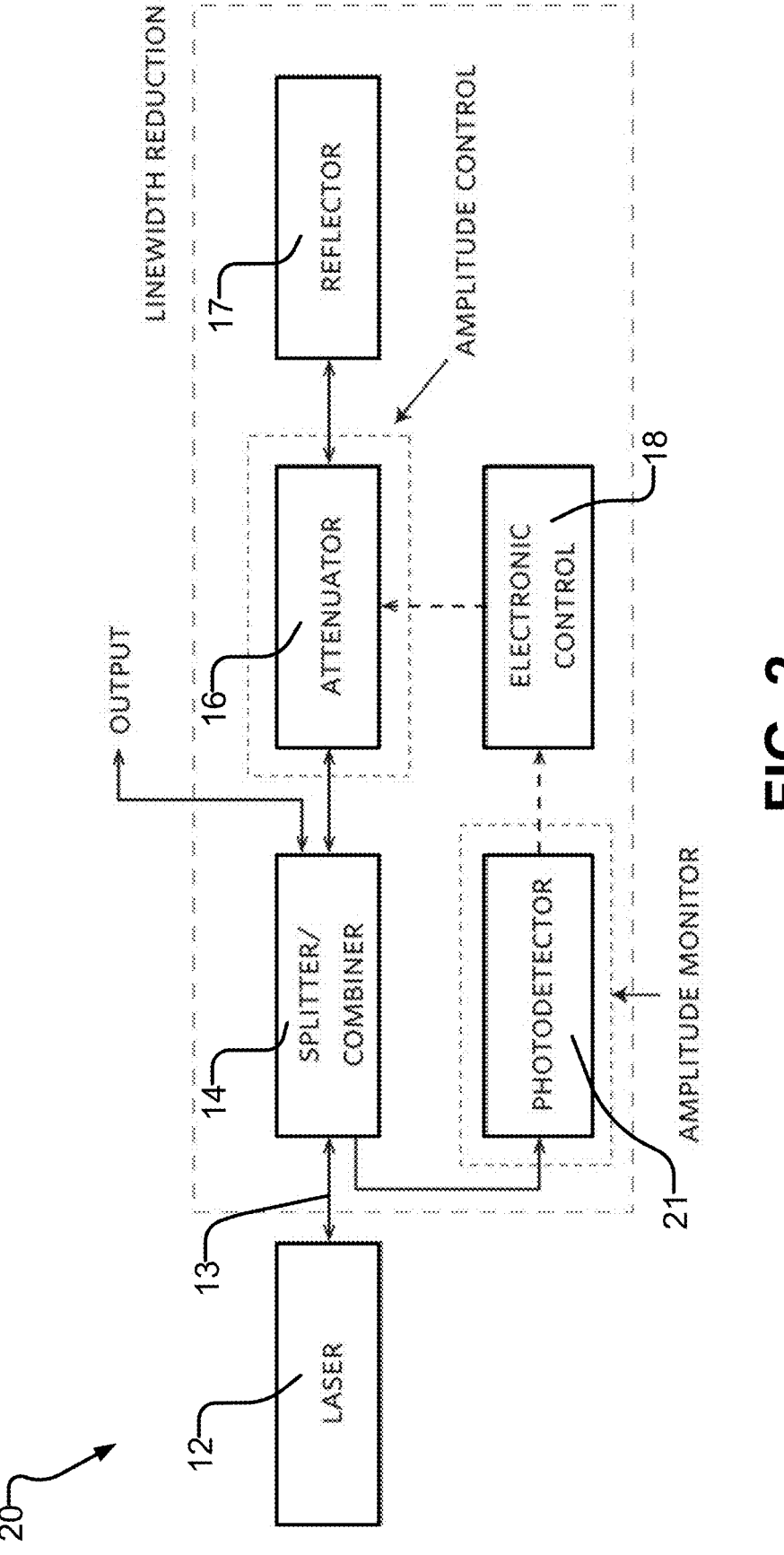
FIG. 2 is a block diagram of an electronically-controlled linewidth reduction system similar to that of FIG. 1 with a monitor for amplitude of the optical feedback.

FIG. 2 is a block diagram of a light source 20 comprising an electronically-controlled linewidth reduction system according to another example embodiment. Light source 20 is similar to light source 10 except that it includes a sensor that provides feedback to electronic control 18.

Similar to light source 10, an optical feedback signal is directed back to light emitter 12 using a splitter/combiner 14. Light source 20 includes a photodetector 21 connected to measure and monitor the amplitude of the optical feedback signal. Photodetector 21 may for example comprise a n+/n/n+ device, or a p+/p/p+ device, or a p-i-n device, or a reverse-biased p/n junction, or a germanium silicon photodetector, or any other suitable light detector that converts optical energy to electrical energy (or produces an output signal that is correlated to an intensity of light incident on the light detector). Photodetector 21 can be located elsewhere to measure the optical power exiting light emitter 12 or in another location where an amplitude of light detected by photodetector 21 is correlated to a desired amplitude and/or phase of the optical feedback signal for providing a reduced laser linewidth.

In light source 20, electronic control 18 is connected to receive the electrical signal from photodetector 21 and to actuate attenuator 16 to cause the optical feedback signal to have a corresponding value. For example, electronic control 18 may cause optical feedback signal to have an amplitude that is related to the amplitude of beam 13 by a certain feedback ratio or by a certain function or electronic control 18 may use the output signal of photodetector 21 as a key to retrieve a value from a lookup table that indicates the control signal to be applied to attenuator 16 and/or the desired amplitude of the optical feedback signal to yield a reduced spectral linewidth of beam 13.

Providing an electronic control that provides dynamic control of the phase and/or amplitude of the optical feedback signal as in FIG. 2 and other disclosed embodiments can advantageously maintain a reduced or minimized spectral linewidth of beam 13 despite changes that may occur as a result of one or more of:

optical reflections or other light entering light emitter 12 from a downstream device, especially if an optical isolator 19 is not being used;

changes in temperature in cases where the effect of temperature changes on light emitter 12 and components of the linewidth reduction system (e,g, components of the integrated photonic circuit) are different;

variations of optical properties of waveguides, optical fibers etc. in the light source which may be caused by acoustic noise, strain, pressure-induced noise etc.

An advantage of embodiments that provide dynamic control of spectral linewidth as described herein is that the linewidth reduction system may automatically cancel fiber noise (e,g, noise caused by mechanically induced changes in the optical properties of an optical fiber that carries coherent light beam 13 to other components of a linewidth reduction system.

Figure 3:
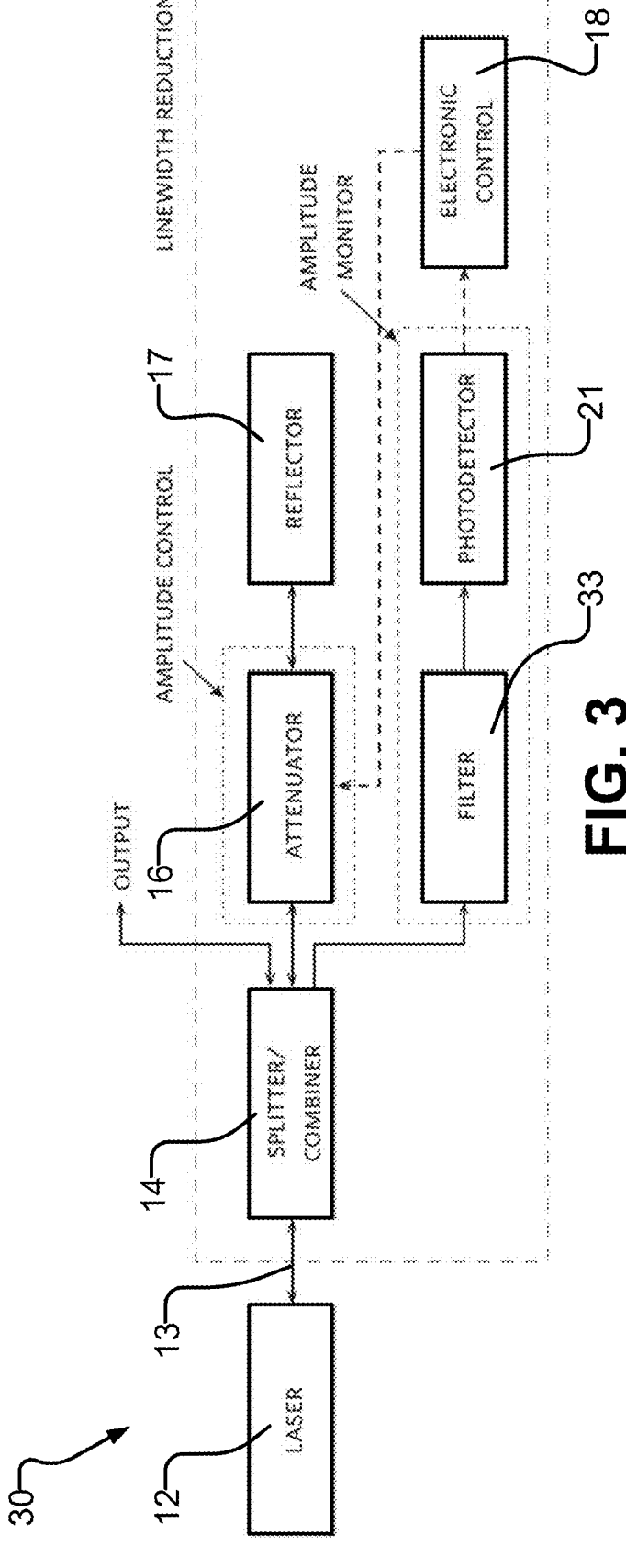
FIG. 3 is a block diagram of an electronically-controlled linewidth reduction system similar to that of FIG. 2 with the addition of an optical filter in the monitor.

FIG. 3 is a block diagram of a light source 30 according to another example embodiment. In light source 30, the spectral linewidth of beam 13 is monitored. In this example the monitoring is performed by the combination of a filter 33 (which may comprise a bandpass filter and/or a bandreject filter) and a photosensor 21.

A bandreject filter used in filter 33 may have a narrow bandwidth (e.g. on the order of kHz), sufficient to filter out the laser carrier frequency from a sample of beam 13. Photodetector 21 receives the sample of beam 13 that has been filtered by bandreject filter 33. The signal detected by photodetector 21 can be used to measure the optical power in sidebands of the spectrum of beam 13 (which contribute to larger spectral linewidth). This power can act as a means of indicating a broadened laser linewidth.

In some embodiments the bandreject filter and/or bandpass filter are tunable to set the pass band or reject band as applicable to match the carrier frequency of light emitter 12. Tuning may be used to adjust for manufacturing variations in filters 33 that are made using photonic circuit elements such as ring resonators and/or to compensate for drift of the frequency of light emitter 12 relative to the pass band and/or reject band of filter 33 which may occur, for example, as a result of temperature changes.

An electronic control 18 may use the power in the sidebands of the spectrum of beam 13 as a feedback signal to control amplitude of the optical feedback signal so as to reduce or minimize the spectral linewidth of beam 13.

Bandreject filter 33 may, for example, be realized using a contradirectional coupler, or a phase-shifted contradirectional coupler, or a microring resonator, or a racetrack resonator, or any form of bandreject filter.

A passband filter used in filter 33 may be detuned to the laser carrier frequency of light emitter 12 and have a bandwidth sufficient to measure the optical power in the sidebands of the spectrum of beam 13. Photodetector 21 may detect a sample of light from beam 13 that has been filtered by bandpass filter 33 and the resulting output signal may be used to measure the optical power in the sideband of the laser spectrum. This power indicate a broadened laser linewidth and may be applied as a feedback signal to electronic control 18 to facilitate reducing or minimizing the spectral linewidth of beam 13.

A bandpass filter for use in filter 33 may, for example, be realized using a contradirectional coupler, or a phase-shifted contradirectional coupler, or a microring resonator, or a racetrack resonator, or any other suitable form of bandpass filter.

Figure 4:
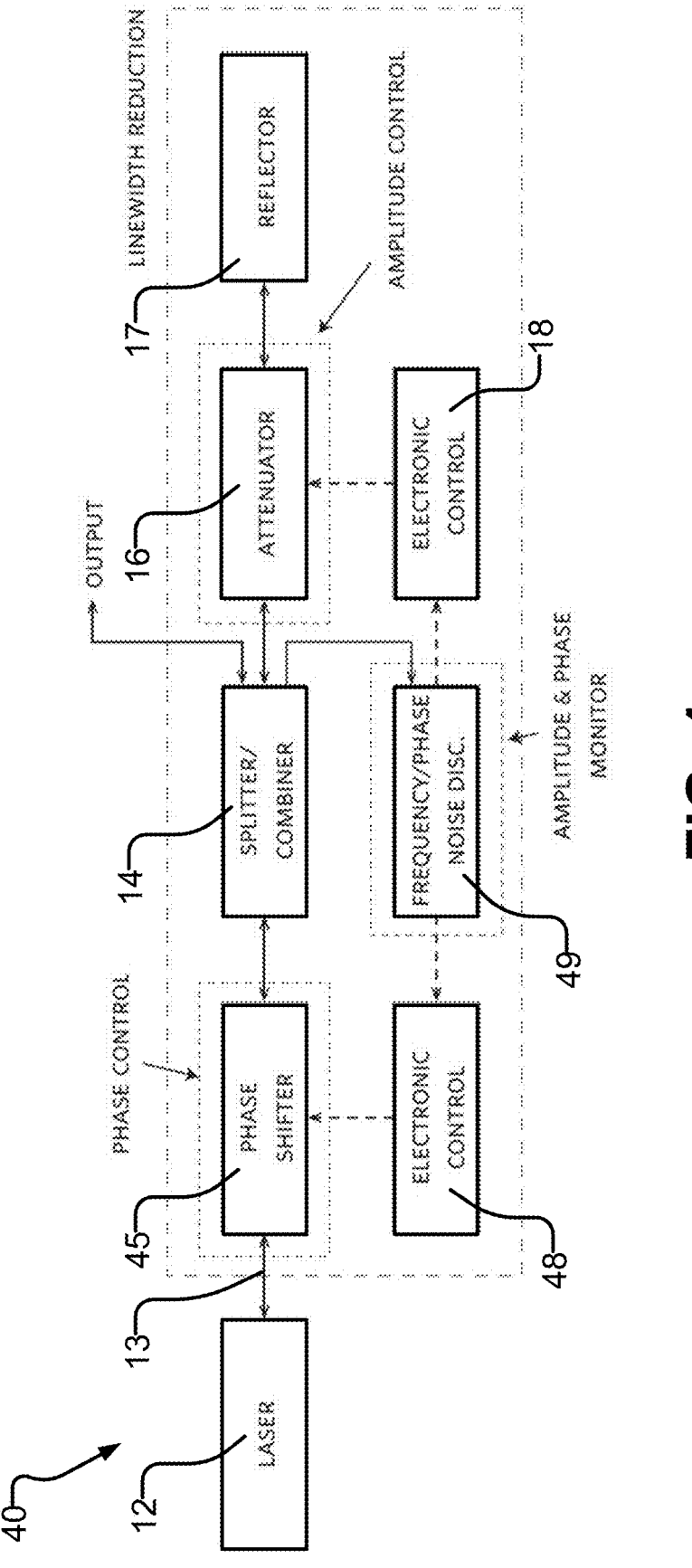
FIG. 4 is a block diagram of an electronically-controlled linewidth reduction system based on optical feedback, with independent amplitude control and phase control, and amplitude and phase monitor of optical feedback according to an embodiment of the present invention.

FIG. 4 is a block diagram of a light source 40 according to another example embodiment. Light source 40 manages spectral linewidth in beam 13 by controlling both amplitude and phase of an optical feedback signal. In some embodiments, control of amplitude and phase is independent. In some embodiments control of amplitude and phase is coordinated.

In light source 40 the amplitude and phase of an optical feedback signal are monitored by a frequency/phase noise discriminator 49. Frequency/phase noise discriminator 49 may, for example, be constructed as described in. E. Rubiola, V. Giordano, "Correlation-based phase noise measurements", Review of Scientific Instruments vol. 71 no. 8 pp. 3085-3091, August 2000 or as described in S. Camatel and V. Ferrero, "Narrow Linewidth CW Laser Phase Noise Characterization Methods for Coherent Transmission System Applications," in Journal of Lightwave Technology, vol. 26, no. 17, pp. 3048-3055, Sep. 1, 2008, doi: 10.1109/JLT.2008.925046.

Frequency/phase noise discriminator 49 may, for example, be based on an imbalanced Mach-Zehnder interferometer, with a long delay in one arm, and a photodetector at one, or both of the Mach-Zehnder interferometer arms. The frequency/phase noise discriminator 49 may also be based on any device operative to convert optical phase fluctuations to amplitude fluctuations, which can be detected using a photodetector.

Light source 40 includes a phase shifter 45 in an optical path of the optical feedback signal. Phase shifter 45 may be controlled to vary a phase of the optical feedback signal. In light source 40, phase shifter 45 is located between light emitter 12 and splitter/combiner 14. In other embodiments a phase shifter 45 is located at other locations along an optical path by which an optical feedback signal is delivered. See FIGS. 6 to 8 and 13 for some examples of alternative placements of a phase shifter. For example, a phase shifter 45 may be placed between an attenuator 16 and reflector 17. In some embodiments, plural phase shifters 45 are provided along an optical path of the optical feedback signal and the phase shifters 45 are collectively controlled to apply a desired phase shift to the optical feedback signal.

A phase shifter 45 may, for example, comprise a heater placed to heat an optical waveguide (e.g. above or adjacent to the optical waveguide), a p, or n, doped waveguide, a reverse-biased p/n junction, a p-i-n doped waveguide, or any other device that results in a controllable change in the phase of the optical signal. In some embodiments some or all phase shifters provided in any apparatus as described herein are dynamically controlled to compensate for the effect of temperature changes on the phase shift provided by a given control signal. In some embodiments control signals for one or more phase shifters are generated based on calibration tables corresponding to different temperatures. Temperature at the location of a phase shifter may be determined from temperature sensors (which may for example measure temperature of a substrate of an integrated photonic circuit chip that includes the phase shifter.

Light source 40 includes a first electronic control 18 configured to control the amplitude of the optical feedback signal and a second electronic control 48 configured to control the phase of the optical feedback signal. Each of electronic controls 18 and 48 receive an output signal from frequency/phase noise discriminator 49. In some alternative embodiments the functions of electronic controls 18 and 48 are combined in a single electronic control.

Electronic control 18 is configured to adjust the amplitude of the optical feedback signal by controlling attenuator 16. Electronic control 18 may perform feedback control of the amplitude of the optical feedback signal using an output signal from frequency/phase noise discriminator 49 as a feedback signal.

Electronic control 48 is configured to adjust the phase of the optical feedback signal by controlling phase shifter 45. Electronic control 48 may perform feedback control of the phase of the optical feedback signal using an output signal from frequency/phase noise discriminator 49 as a feedback signal.

Electronic controls 18, 48 can operate to adjust both the amplitude and the phase of the optical feedback signal by controlling both attenuator 16 and phase shifter 45 to reduce or minimize the spectral linewidth of beam 13.

In some embodiments, electronic controls 18 and 48 are combined or configured to interact together to perform a 2D sweep of amplitude and phase to determine optimal values for the control of attenuator 16 and phase shifter 45 that yield the minimum spectral linewidth of beam 13. In some embodiments such a sweep is performed in a calibration procedure for one or more sets of operating conditions and the optimal values are stored for later use by controllers 18, 48. In some embodiments Electronic controls 18, 48 may periodically or continuously vary the values being used for the control of attenuator 16 and phase shifter 45 to determine whether further reduction of the spectral linewidth of beam 13 is possible.

Figure 5:
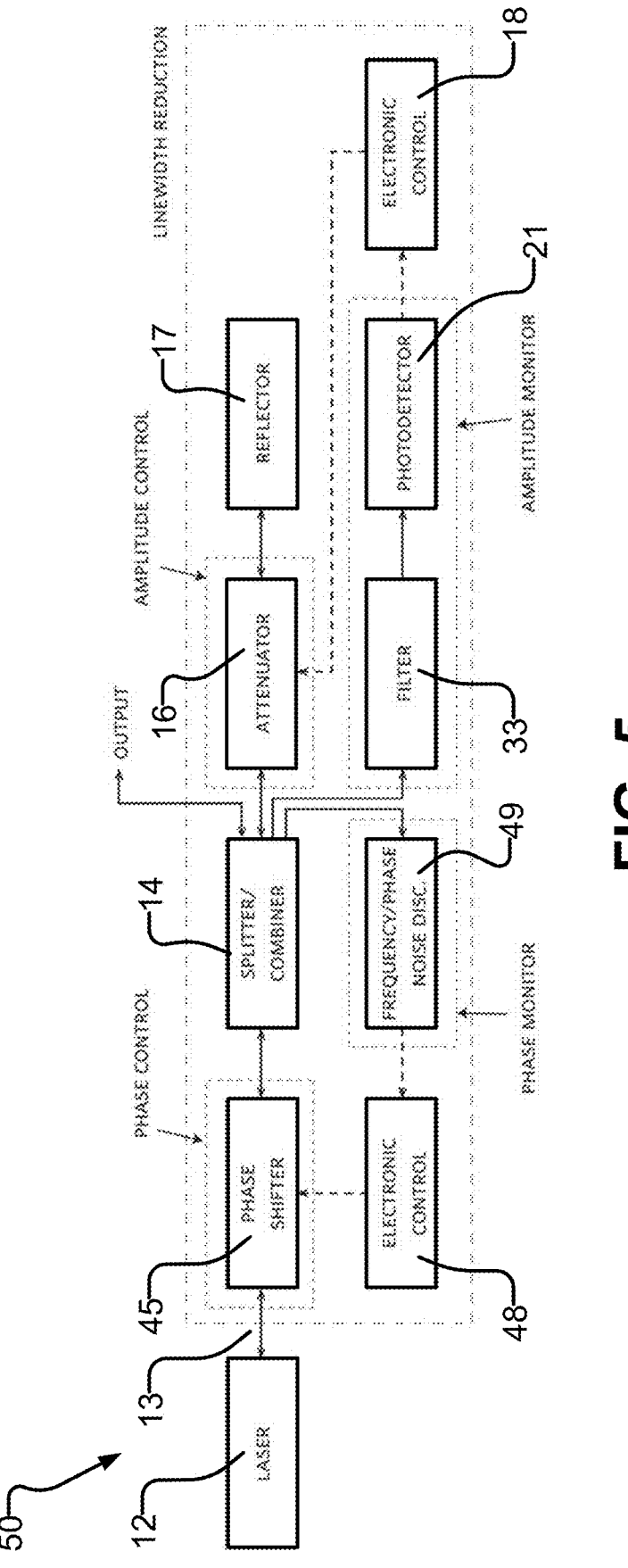
FIG. 5 is a block diagram of an electronically-controlled linewidth reduction system based on optical feedback with independent control of amplitude and phase of an optical feedback signal and independent amplitude and phase monitoring of the optical feedback.

FIG. 5 is a block diagram of a light source 50 according to another example embodiment. Light source 50 is similar to light source 40 in that spectral linewidth of beam 13 is controlled by electronic controls 18, 48 which set both phase and amplitude of an optical feedback signal. Light source 50 differs from light source 40 in that feedback to electronic control 18 for control of attenuator 16 is provided by the combination of a filter 33 and a photodetector 21 as described above with reference to FIG. 3.

Figures 6, 6A:
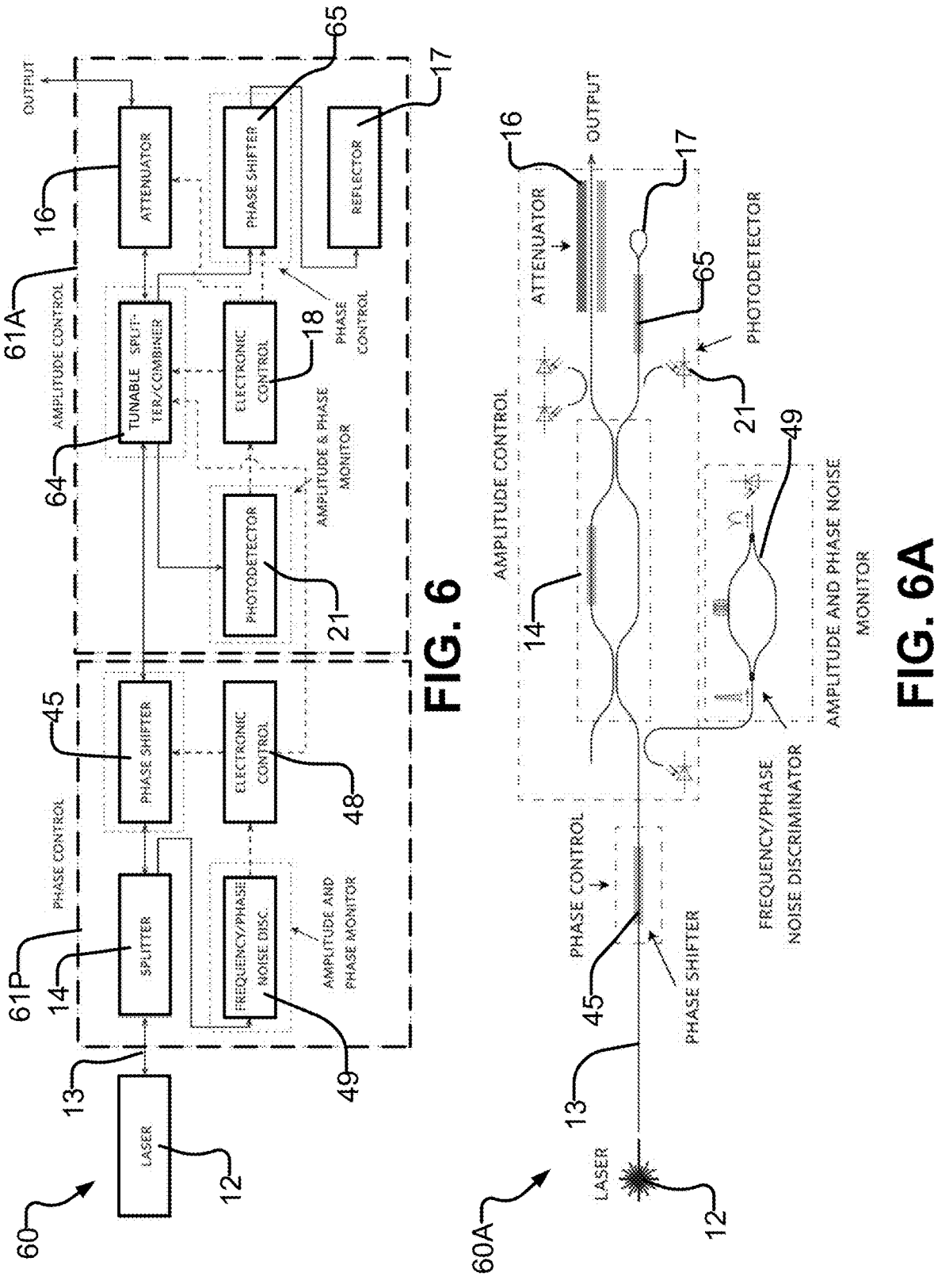
FIG. 6 is a block diagram of an electronically-controlled linewidth reduction system based on optical feedback, with independent amplitude and phase control, and amplitude and phase monitor of optical feedback.
FIG. 6A is a schematic diagram of an electronically-controlled linewidth reduction optical circuit based on the electronically-controlled linewidth reduction system shown in FIG. 6.

FIG. 6 is a block diagram of a light source 60 according to another example embodiment. Light source 60 includes controllers 18, 48 which independently or in coordination control amplitude and phase of an optical feedback signal.

Section 61A controls the amplitude of the optical feedback signal. Section 61P controls the phase of the optical feedback signal. The construction and operation of section 61P may be the same as or similar to those of the portions of light sources 40 and 50 that perform phase control of the optical feedback signal. Phase shifter 65 provides control of the amplitude of the optical feedback signals as well as additional control of the phase of the optical feedback signal.

Section 61A includes electronic control 18 which controls an attenuator 16, a tunable splitter/combiner 64 and a phase shifter 65 to adjust an amplitude of an optical feedback signal. Attenuator 16 can be operated to reduce or eliminate reflections from reaching light emitter 12.

Light from beam 13 is tapped by tunable splitter/combiner 64 and delivered to a reflector 17 by way of phase shifter 65. The light reflected by reflector 17 is directed by tunable splitter/combiner 64 back to light emitter 12 by phase shifter 45.

Electronic control 48 is configured to adjust the phase and/or amplitude of the optical feedback signal by controlling phase shifter 45 and/or tunable splitter/combiner 64. Electronic control 48 may perform feedback control of the phase and/or amplitude of the optical feedback signal using an output signal from frequency/phase noise discriminator 49 as a feedback signal. Phase noise detected by frequency/phase noise discriminator 49 is increased whenever the amplitude or the phase of the optical feedback signal is not well adjusted. Therefore, the feedback signal from frequency/phase noise discriminator 49 may be used to control both phase and amplitude of the optical feedback signal.

In some embodiments an output of an amplitude monitor (e.g. a photodetector 21) is used for coarse control of the amplitude of the optical feedback signal. Fine control of the amplitude of the optical feedback signal to minimize spectral linewidth of the light in beam 3 may then be achieved using phase noise output by frequency/phase noise discriminator 49.

For example an electronic control may first control the amplitude of the optical feedback signal to have a value determined in a previous calibration routine (that value may, for example be accessed in a lookup table or data store. This may be done while using a measured amplitude of the optical feedback signal as a feedback signal to the electronic control. Subsequently the electronic control may fine tune the amplitude of the optical feedback signal to obtain a further reduced or minimized spectral line width based on a feedback signal from frequency/phase noise discriminator 49 that represents phase noise.

Primary control of the amplitude of the optical feedback signal may be achieved by controlling the portion of light that is tapped by tunable splitter/combiner 64. Tunable splitter/combiner 64 may be controlled to adjust the amplitude of the optical feedback signal by tapping a certain power ratio of the light in beam 13 such that the amplitude of the optical feedback signal delivered back to light emitter 12 is sufficient for linewidth narrowing.

Tunable splitter/combiner 64 may, for example, be based on a Mach-Zehnder interferometer with a phase shifter on one or both of the Mach-Zehnder interferometer arms or any other device that results in a variable power splitting ratio controlled by an input electrical signal.

FIG. 6A is a schematic diagram showing an example integrated photonic circuit realization of the optical parts of a light source 60A which is similar to light source 60.

Figure 7:
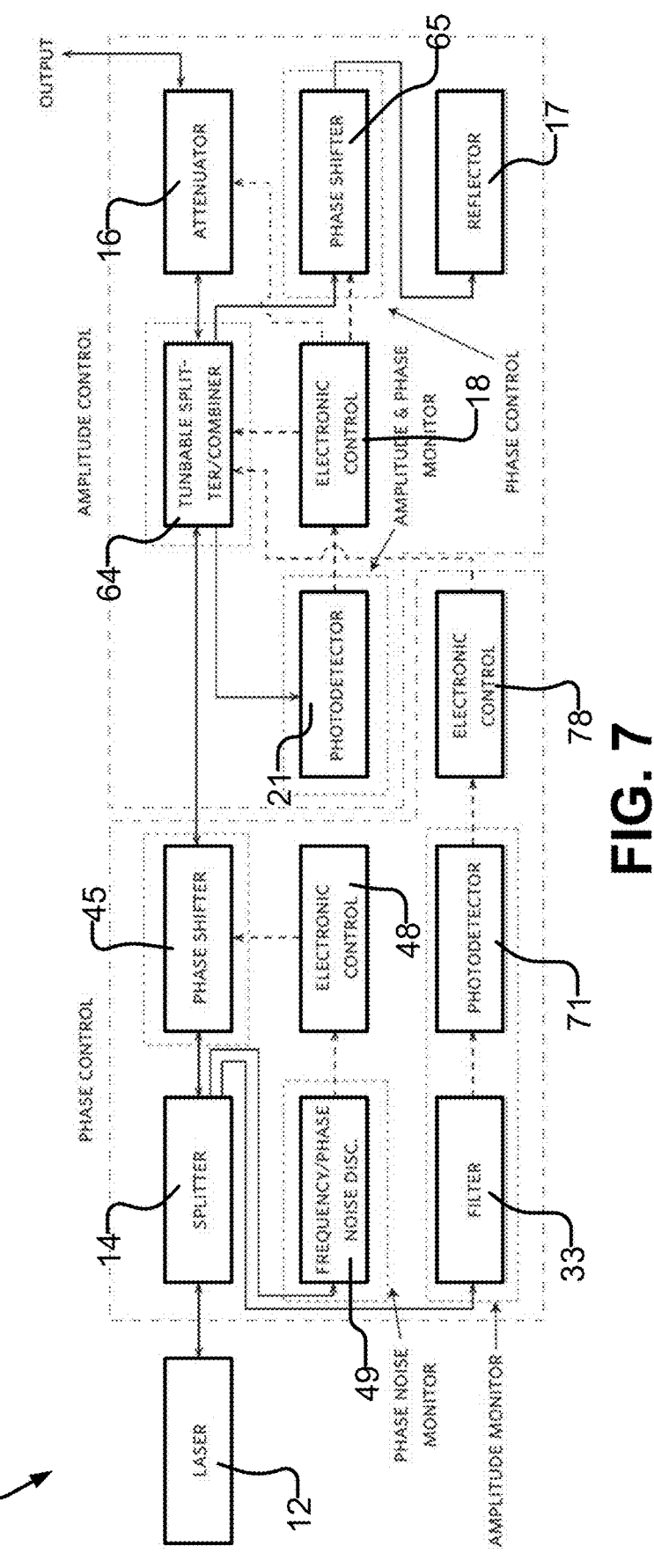
FIG. 7 is a block diagram of an electronically-controlled linewidth reduction system based on optical feedback, with independent amplitude control and phase control, and independent amplitude and phase monitor of optical feedback.

FIG. 7 is a block diagram of a light source 70 according to another example embodiment. Light source 70 is similar to light source 60 except that it includes an additional electronic control 78 which takes a feedback signal from the combination of a filter 33 and photosensor 71 which may be constructed and operate in the same or similar manner as filter 33 and photosensor 21 which are described with reference to FIG. 3. Electronic control 78 is connected to control tunable splitter/combiner 64.

In light source 70, the amplitude of the optical feedback signal can be independently adjusted based on the signal monitored by the photodetector 71 following filter 33. The phase of the feedback signal can be independently adjusted based on the signal monitored by frequency/phase noise discriminator 49.

Figures 7A, 7B:
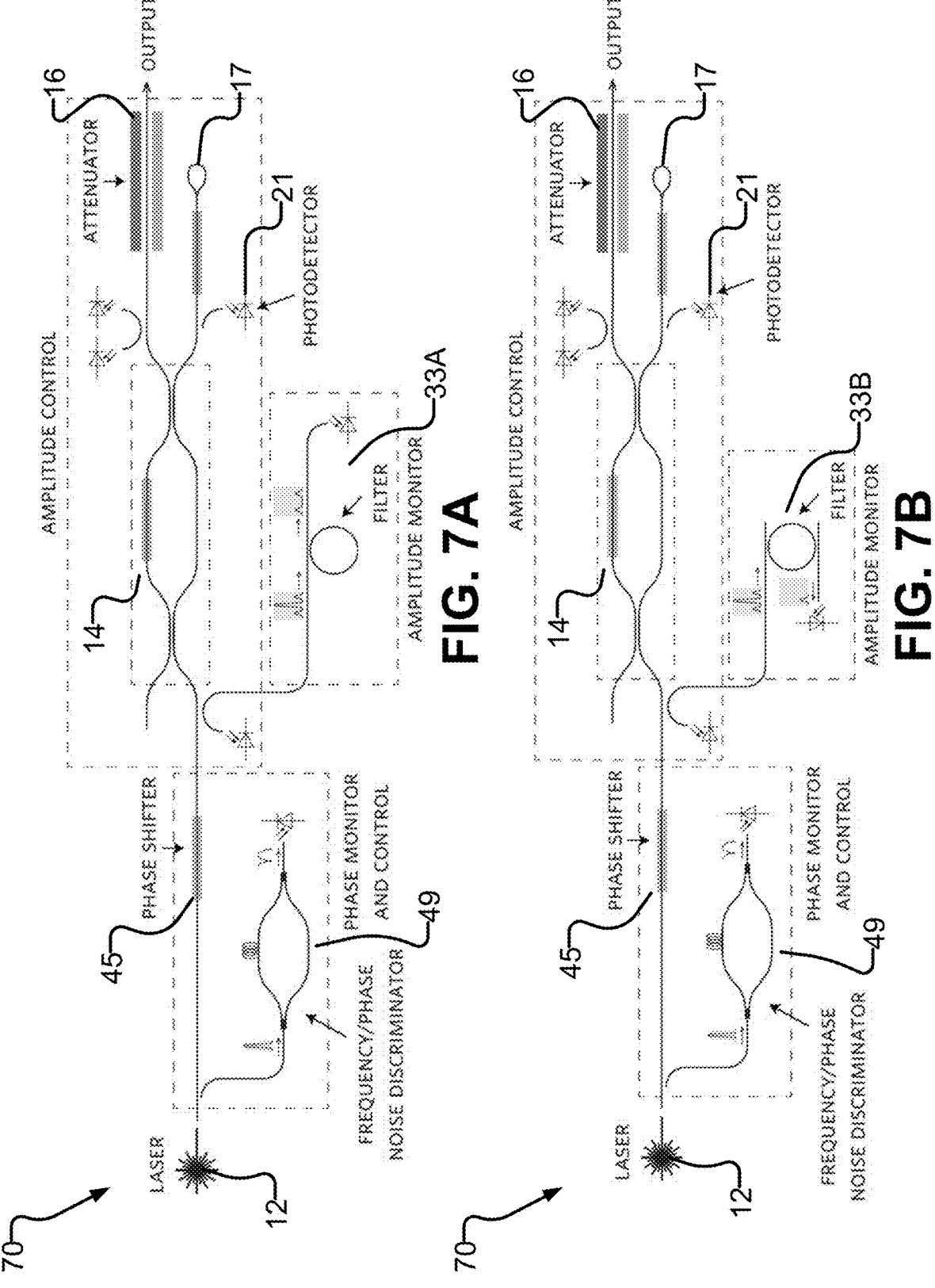
FIG. 7A is a schematic diagram of an electronically-controlled linewidth reduction optical circuit based on the electronically-controlled linewidth reduction system shown in FIG. 7 according to one exemplary embodiment of the present invention.
FIG. 7B is schematic diagram of another linewidth reduction optical circuit based on the electronically-controlled linewidth reduction system shown in FIG. 7 according to one exemplary embodiment of the present invention.
Figure 7C:
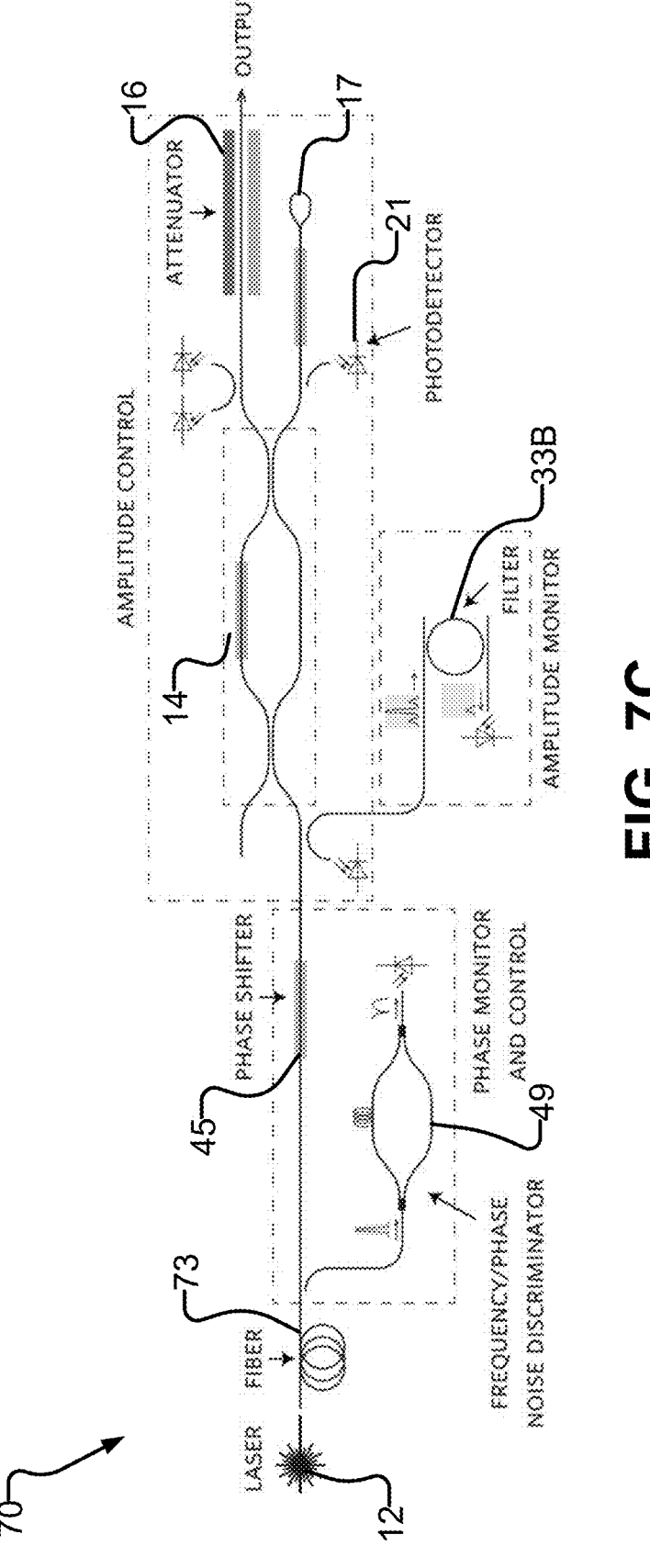
FIG. 7C is a schematic diagram of a linewidth reduction optical circuit based on the electronically-controlled linewidth reduction system shown in FIG. 7 according to one exemplary embodiment of the present invention.

FIGS. 7A to 7C are schematic illustrations of different ways to implement optical components of a light source generally like that of FIG. 7 in integrated photonic circuits.

FIG. 7A is a schematic diagram showing an example integrated photonic circuit realization of a linewidth reduction optical circuit based on optical feedback, with independent amplitude control and phase control, and independent amplitude and phase monitors. The bandreject filter 33A used in the amplitude monitor can be tuned to the laser frequency to filter out the laser frequency and measure the optical power in the sidebands. The bandreject filter 33A used in the amplitude monitor is based on a ring resonator here, but any other form of bandreject filter can be used.

FIG. 7B is a schematic diagram showing another example integrated photonic circuit realization of a linewidth reduction optical circuit shown in FIG. 7 based on optical feedback, with independent amplitude control and phase control, and independent amplitude and phase monitors, in accordance with one exemplary embodiment of the present invention. The bandpass filter 33B used in the amplitude monitor can be detuned relative to the laser frequency to filter out the laser frequency and measure the optical power in the sidebands. The bandpass filter 33B used in the amplitude monitor is based on a ring resonator here, but any other form of bandpass filter can be used.

FIG. 7C is another possible integrated circuit realization of a linewidth reduction optical circuit shown in FIG. 7 based on optical feedback, with independent amplitude control and phase control, and independent amplitude and phase monitors, in accordance with one exemplary embodiment of the present invention. An optical fiber 73 is added between light emitter 12 and the phase monitor and control as to reduce the laser linewidth due to the long distance between the laser and the feedback reflections. Any noise in the fiber (acoustic, perturbations) gets cancelled by the frequency/phase noise discriminator 49 causing an opposite noise to be introduced in the phase shifter 45 or 65. In the round-trip path between the laser and the reflector 17, both the induced noise and the equal-but-opposite cancelling noise see a similar doubling effect.

Figure 8:
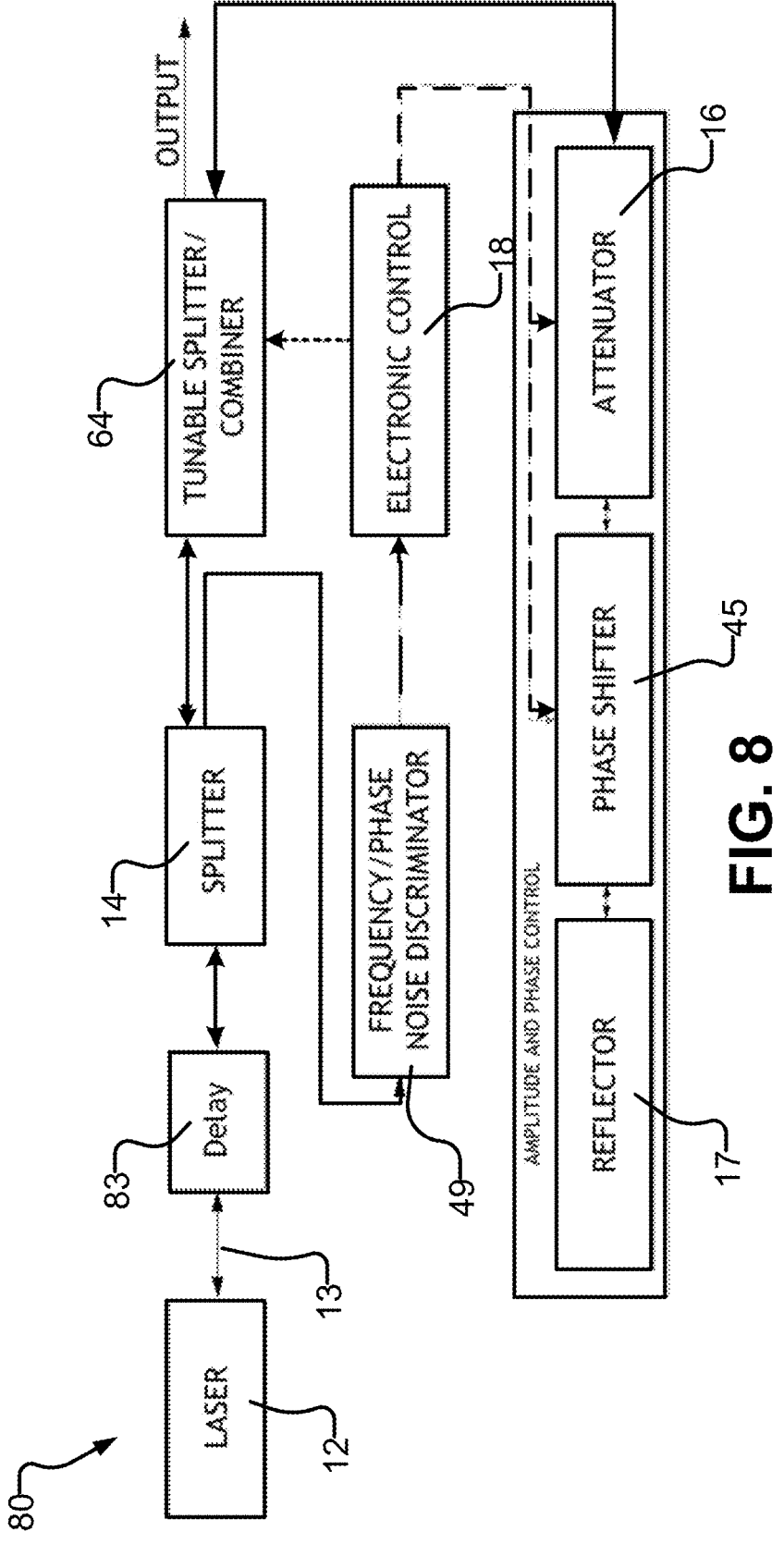
FIG. 8 is a block diagram of an electronically-controlled linewidth reduction system.

FIG. 8 is a block diagram of a light source 80 according to another example embodiment. In light source 80, the spectral linewidth of beam 13 emitted by light emitter 12 is monitored by a frequency/phase noise discriminator 49. The phase and amplitude of the optical feedback signal can be adjusted based on feedback from the output signal of frequency/phase noise discriminator 49 (the output signal may, for example, comprise the output of a photodetector of frequency/phase noise discriminator 49.

A delay element 83 is located between light emitter 12 and splitter 14. An example of a delay element is an optical fiber. The delay caused by the delay element 83 can be detected and monitored by frequency/phase noise discriminator 49. The noise caused by the delay element 83 can be detected and monitored by frequency/phase discriminator 48 and cancelled by the phase shifter 45 or 65.

Linewidth reduction systems and methods as described herein may be applied in cases where a light source produces coherent light at two or more different wavelengths. For example such systems may be applied when light from plural single wavelength lasers is combined or when a multi-wavelength laser is used.

Figures 9, 10:
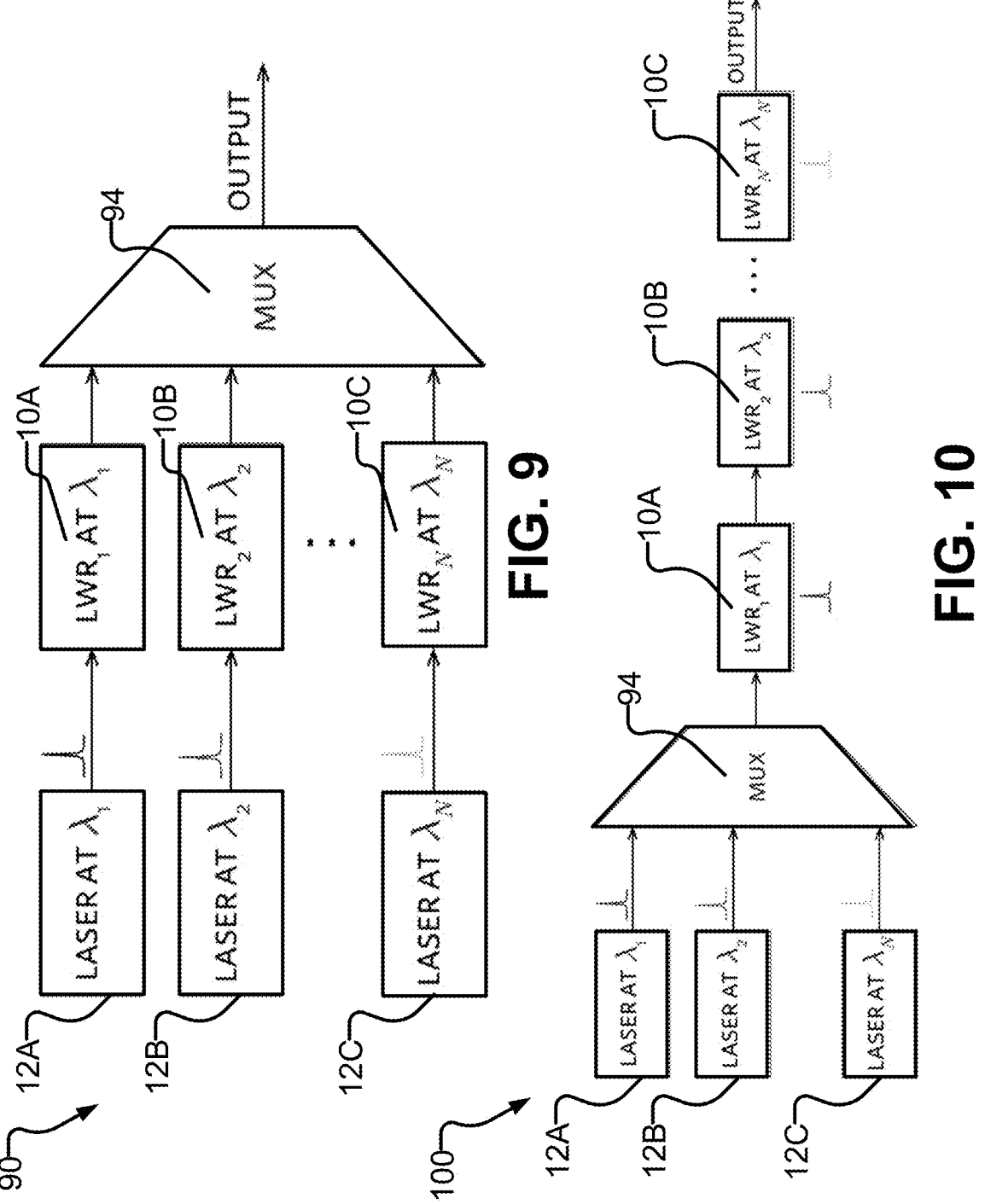
FIG. 9 is a block diagram of an electronically-controlled linewidth reduction system comprising multiple single wavelength lasers.
FIG. 10 is a block diagram of another electronically-controlled linewidth reduction system comprising multiple single wavelength lasers.

FIG. 9 is a block diagram that depicts a multi-wavelength light source 90 that includes plural linewidth reduction systems. Light source 90 includes from 1 to N single wavelength lasers (12A, 12B, 12C, etc.). Each laser 12 emits light at a single wavelength. A linewidth reduction system (10A, 10B, 10C, etc.) according to any of the embodiments described herein is provided for each of lasers 12. Each linewidth reduction system operates at the same wavelength as the corresponding laser. The output light from each linewidth reduction system 10 may be combined at a wavelengths multiplexer 94. The output of wavelengths multiplexer 94 will contain the multiple wavelengths with reduced linewidth for each wavelength. An optical isolator, not shown, may be provided in series with the output of wavelengths multiplexer 94 and/or at outputs of linewidth reduction systems 10 to protect lasers 12 from remote reflections.

FIG. 10 is a block diagram that depicts a multi-wavelength light source 100 that includes plural linewidth reduction systems. Light source 100 includes a number (1 to N) of single wavelength lasers 12, individually indicated by 12A, 12B, 12C etc. A wavelengths multiplexer 94 is connected to multiplex the wavelengths emitted from all of lasers 12. The output of wavelengths multiplexer 94 contains the multiple wavelengths.

A plurality of linewidth reduction systems 10 according to any of the embodiments described herein are each connected to generate an optical feedback signal for a corresponding one of light sources 12. The optical feedback signals are delivered to the light sources 12 through wavelengths multiplexer 94.

Each of linewidth reduction systems 10 includes a wavelength-selective filter (not shown) that couples a portion of the light of the corresponding wavelength into the linewidth reduction system. Each linewidth reduction system 10 works at the same wavelength as the corresponding laser 12 that the wavelength-selective filter filters.

Each linewidth reduction system 10 acts as a passive waveguide for light of other wavelengths that the wavelength selective filter does not filter. The output after the $N^{th}$ linewidth reduction system will contain the multiple wavelengths produced by lasers 12 with reduced linewidth for each wavelength. An optical isolator, not shown, may be also used in series with the output to protect the laser from remote reflections.

Figures 11, 12:
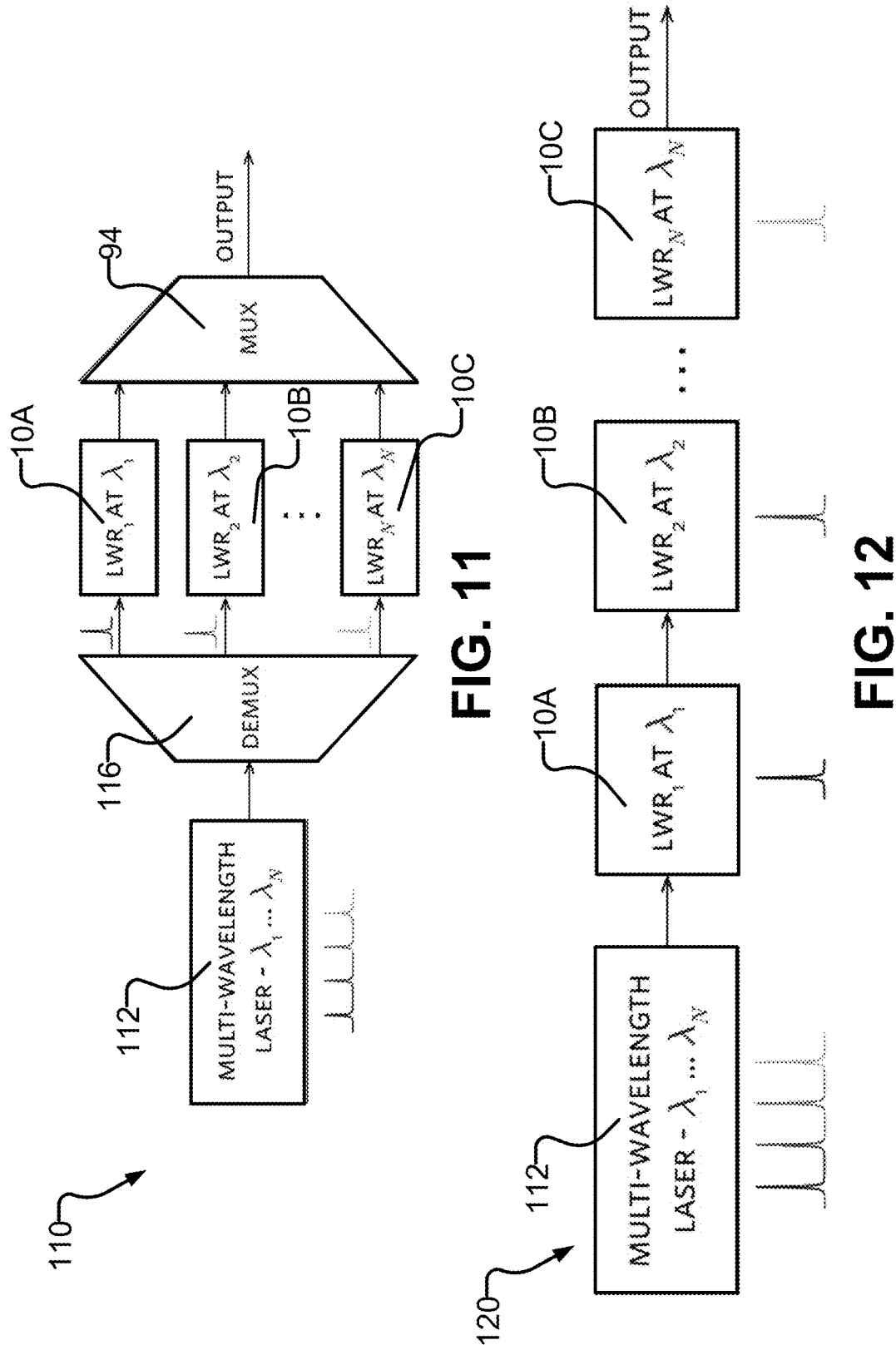
FIG. 11 is a block diagram of an electronically-controlled linewidth reduction system comprising a single multi-wavelength laser.
FIG. 12 is a block diagram of an electronically-controlled linewidth reduction system comprising a single multi-wavelength laser.

FIG. 11 is a block diagram showing a light source 110 according to another embodiment. In light source 110, a multi-wavelength laser 112 emits light having plural wavelengths. The output of multi-wavelength laser 112 is delivered to a wavelengths demultiplexer 116 which demultiplexes the wavelengths into separate waveguides. Any or all of the waveguides can contain a linewidth reduction system 10 that operates at one of the wavelengths produced by multi-wavelength laser 112. The outputs of linewidth reduction systems 10 may be combined, if desired by a wavelengths multiplexer 94. The output of the wavelengths multiplexer 94 will contain the multiple wavelengths with reduced linewidth for each wavelength. An optical isolator, not shown, may be provided in series with the output of wavelengths multiplexer 94 to protect laser 112 from remote reflections.

FIG. 12 is a block diagram that shows another example light source 120 that uses plural linewidth reduction systems together with a multi-wavelength laser 112. The output of multi-wavelength laser 112 contains plural wavelengths. The output of laser 112 passes in sequence through the plurality of linewidth reduction systems 10, each of which may be constructed according to any embodiment described herein. Each of linewidth reduction systems 10 operates to generate an optical feedback signal at one of the wavelengths of multi-wavelength laser 120. A wavelength-selective filter (not shown) which selects for the corresponding wavelength may be used to couple light of the desired wavelength to each of linewidth reduction systems 10. Each linewidth reduction system 10 will work at the corresponding laser wavelength that the wavelength-selective filter filters. Each linewidth reduction system 10 will act as a passive waveguide for the other wavelengths produced by multi-wavelength laser 112. The output after the $N^{th}$ linewidth reduction system will contain the multiple wavelengths each with reduced linewidth. An optical isolator, not shown, may be also used in series with the output to protect the laser from remote reflections.

Wavelength-selective filters in light sources 110 and 120 may, for example comprise filters based on a microring resonator, or a microring resonator with a tunable coupler, or any other filter that can be tuned to a specific wavelength necessary to filter a specific laser frequency for which the linewidth is to be reduced.

Figure 13:
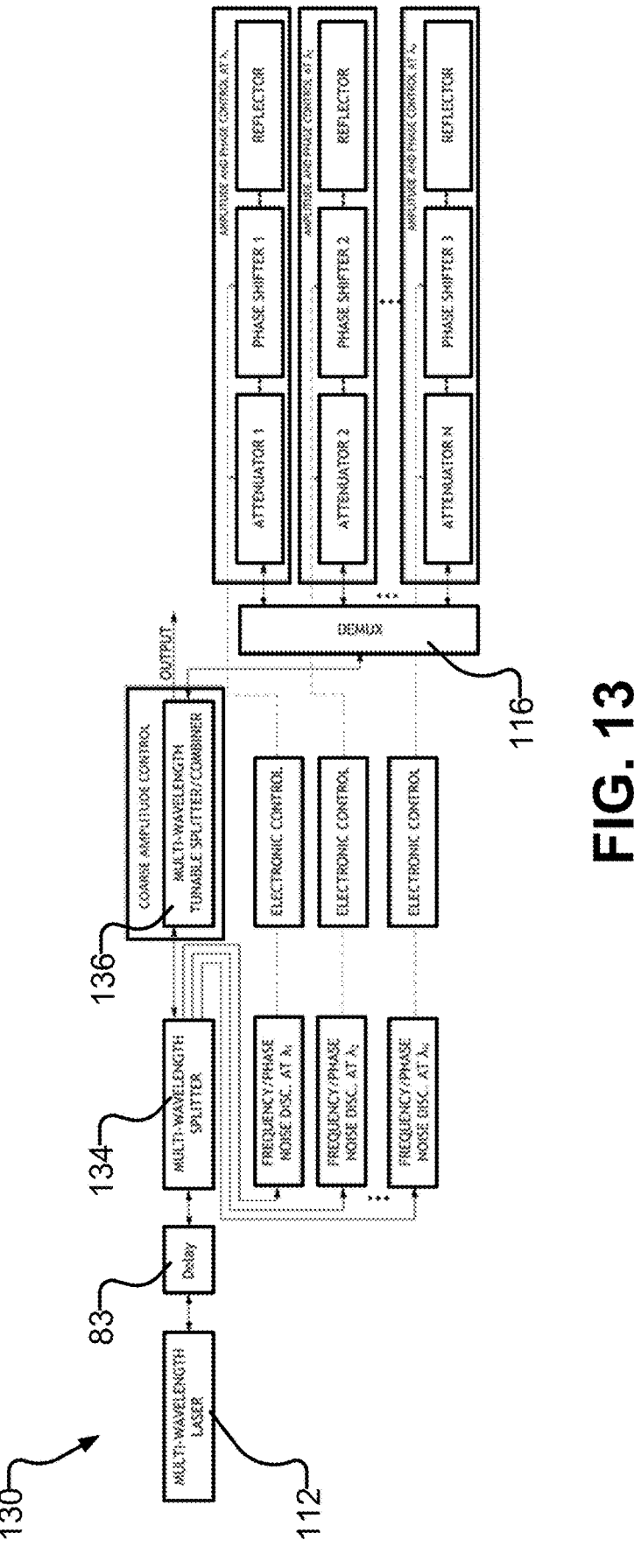
FIG. 13 is a block diagram of an electronically-controlled linewidth reduction system comprising a single multi-wavelength laser.

FIG. 13 is a block diagram of a light source 130 which includes an electronically-controlled linewidth reduction system. Light source 130 comprises a multi-wavelength laser 112. The linewidth of laser 112 at each wavelength is monitored by a corresponding independent frequency/phase noise discriminator 49. Any form of band pass filtering at each wavelength can be used for this aim. A broad band tunable splitter/combiner 136 is used as multi-wavelength coarse amplitude control to tap certain power to optical reflectors. The phase and amplitude of the optical feedback at each wavelength can be adjusted separately according to the signal monitored by the photodetector in the corresponding frequency/phase noise discriminator 49. Suitable delay can be introduced by a delay element 83 using, for example, an optical fiber.

Figure 14:
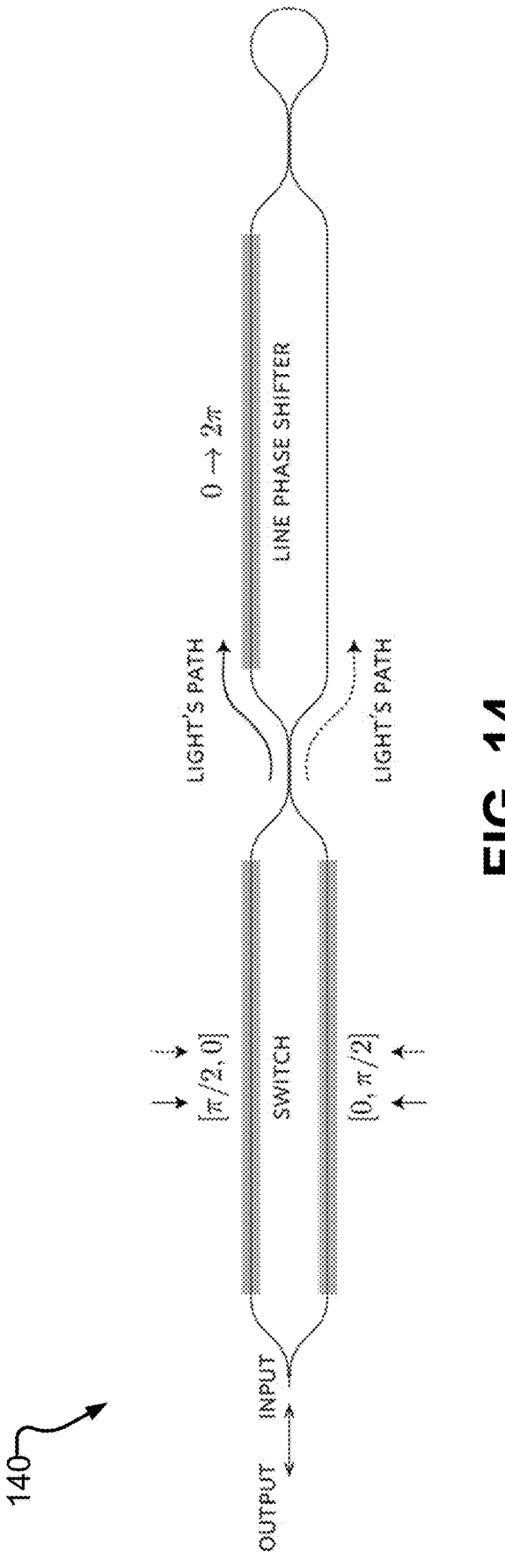
FIG. 14 is a schematic diagram of a single-port reflection endless phase shifter based on a single switch and a line phase shifter.
Figure 15:
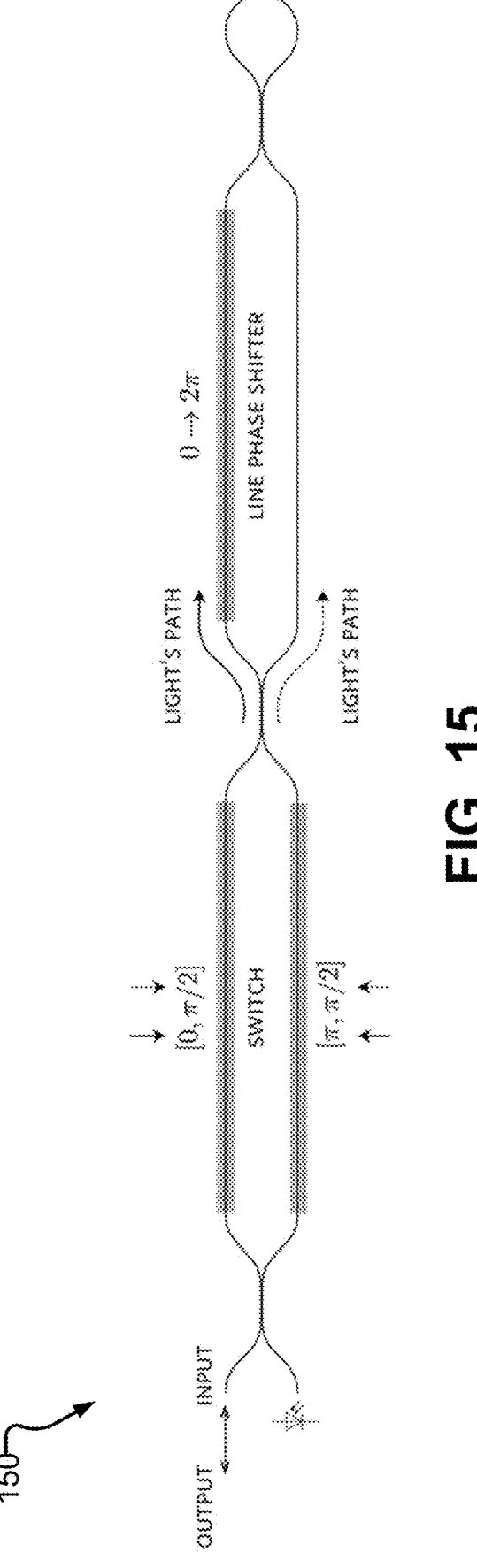
FIG. 15 is a schematic diagram of a two-port reflection endless phase shifter based on a single switch a line phase shifter according to an exemplary embodiment of the present invention.

FIGS. 14 and 15 show examples of endless phase shifters that may be applied to control phases of optical feedback signals in light sources as described herein and may also be used in other applications. An advantage of an endless phase shifter is that it may be used in place of a very long phase shifter while taking up much less room on an integrated photonic circuit chip than would be required by a very long phase shifter.

FIG. 14 is a schematic diagram showing an example single-port reflection endless phase shifter 140. Phase shifter 140 may be used as a phase shifter in the light sources and linewidth reduction systems described herein. Phase shifter 140 may also be used in other applications where a phase shifter is desired. Phase shifter 140 is based on a single switch connected to a line phase shifter. In phase shifter 140, a phase shifted output optical signal is presented at the same port as an input optical signal. Various example embodiments of the present invention, such as those illustrated in FIG. 6A, FIG. 7A, FIG. 7B, and FIG. 7C apply a single-port phase shifter like phase shifter 140.

Single-port reflection endless phase shifter 140 comprises a 1×2 ports coupler connecting the input/output port and the switch, a 2×2 ports coupler connecting the switch and the line phase shifter section, a 2×2 ports coupler connecting the line phase shifter section and a waveguide loop connecting the two ports of the 2×2 ports coupler.

Phase shifters used to implement the switch and the line shifter section may, for example, comprise a heater placed to heat an optical waveguide, a p, or n, doped waveguide, a reverse-biased p/n junction, a p-i-n doped waveguide, or any other device that results in a controllable change in the phase of the optical signal.

FIG. 14 schematically shows the light paths in an active single-port reflection endless phase shifter. The phase shifter in the single-port reflection endless phase shifter switch can be set to switch between $\pi/2$ and 0 in one of the arms and between 0 and $\pi/2$ in the other arm in a push-pull fashion to route the optical signal either to the line phase shifter or the waveguide below the line phase shifter in the line phase shifter section. The switch can be set using an electronic control circuit. The line phase shifter phase can be swept between 0 and $2\pi$. The switch phase can be set to $\pi/2$ initially to route light to the line phase shifter. The line phase shifter phase can be swept using an electronic control circuit. When the phase in the line phase shifter reaches $2\pi$, the switch can be set by changing the top arm and bottom arm phases to 0 and $\pi/2$, respectively in a push-pull fashion to route light to the waveguide in the line phase shifter section without the phase shifter and the line phase shifter can be re-set. Once re-set, the switch can be set back to the original position where the top arm and bottom arm phases are $\pi/2$ and 0 respectively, and route light back to the line phase shifter.

FIG. 15 shows an example two-port reflection endless phase shifter 150. Phase shifter 150 is based on a switch coupled to a line phase shifter. An input optical signal and a phase shifted output optical signal are presented at the same port. Phase shifter 150 may be applied as a phase shifter in light sources and linewidth reduction systems as described herein as well as in other applications where a phase shifter is required. For example, phase shifter 150 may be applied in light sources as shown in FIG. 6A, FIG. 7A, FIG. 7B and FIG. 7C.

Phase shifter 150 comprises a 2×2 ports coupler connecting the input/output port and the switch, a 2×2 ports coupler connecting the switch and the line phase shifter section, a 2×2 ports coupler connecting the line phase shifter section and a waveguide loop connecting the two ports of the 2×2 ports coupler at a single boundary.

Phase shifters in the switch and the line shifter section may comprise a heater located to heat an optical waveguide, a p, or n, doped waveguide, a reverse-biased p/n junction, a p-i-n doped waveguide, or any other device that results in a controllable change in the phase of the optical signal.

Phase shifter 150 may monitor the switching state of the switch, by minimizing the photocurrent at the photodetector shown. This provides a way of lossless monitoring of the switch state.

FIG. 15 schematically shows the light paths in an active two-port reflection endless phase shifter. The phase shifters in the two-port reflection endless phase shifter in the switch can be set to switch between 0 and $\pi/2$ in the top arm and $\pi$ and $\pi/2$ in the bottom arm in a push-pull fashion to route the optical signal either to the line phase shifter or the waveguide below the line phase shifter in the line phase shifter section. The switch can be set using an electronic control circuit. The line phase shifter phase can be swept between 0 and $2\pi$. The switch phase can be set such that the top arm and bottom arm yield a 0 and $\pi$ phase shifts initially to route light to the line phase shifter. The line phase shifter phase can be swept using an electronic control circuit. When the phase in the line phase shifter reaches $2\pi$, the switch can be set such that the top and bottom arms yield $\pi/2$ phase shifts to route light to the waveguide in the line phase shifter section without the phase shifter and the line phase shifter can be re-set. Once re-set, the switch can be set back to $\pi$ and route light back to the line phase shifter.

Referring to FIG. 14 and FIG. 15, a control loop including monitoring photodetector(s), filter(s), and electronic control can be used to ensure the line phase shifter and switch operating at the desired phase point. In some embodiments control signals for switches as provided in phase shifters 140 or 150 are calibrated for proper switch operation by tapping a small portion of light passing out of both arms of the switch, sweeping the phase shifters in the arms of the switch and determining settings for the switch phase shifters when light exiting each arm of the switch is maximized (corresponding to relative phase difference between the arms of 0 and 7 radians) and settings for which light output of both arms of the switch is equalized (corresponding to a relative phase difference of $\pi/2$ between the arms). The values for signals driving the switch phase shifters may be stored and used to control the switch as described herein.

Figures 14A, 14B:
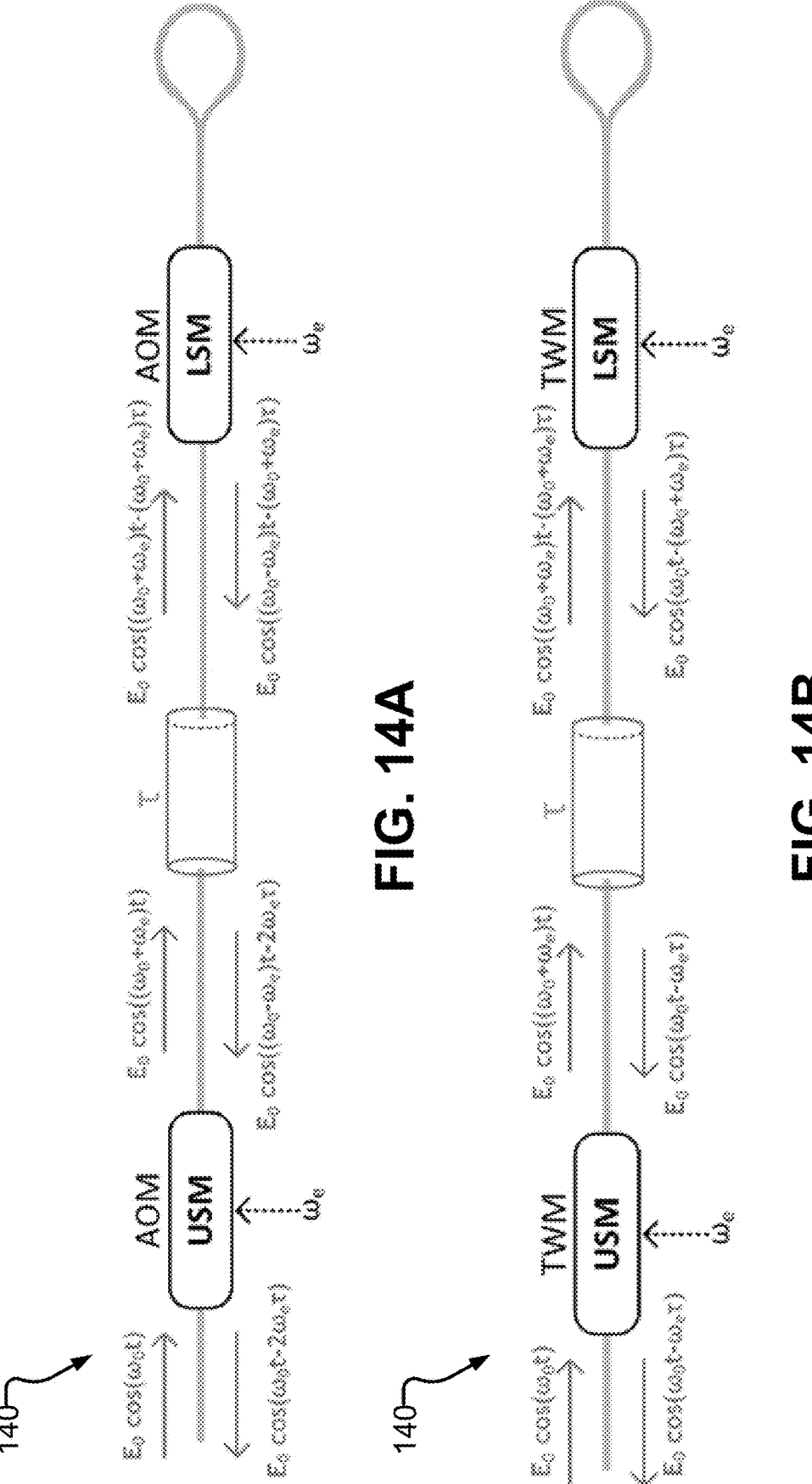
FIG. 14A is a schematic diagram of a large-range single-port reflection phase shifter implemented using single sideband (SSB) acousto-optical modulators (AOMs).
FIG. 14B is a schematic diagram of a large-range single-port reflection phase shifter implemented using single sideband (SSB) traveling wave modulators (TWM).

Referring to FIG. 14, a large-range reflection phase shifter can be implemented using single sideband (SSB) acousto-optical modulators (AOMs) shown in FIG. 14A and/or traveling wave modulators (TWM) shown in FIG. 14B, respectively. The lower sideband modulator (LSM) and upper sideband modulator (USM), when operated by an electrical periodic signal of frequency $\omega_e$, shifts the laser carrier frequency, $\omega_0$, to $\omega_0-\omega_e$ and $\omega_0+\omega_e$, respectively. The electric field amplitude and phase at difference points are shown as well. When the electrical periodic signal's frequency $\omega_e$ is swept over a large range using a voltage controlled oscillator (VCO), a variable and large range phase shift can be obtained without using a large voltage drive on a heater.

Figures 15A, 15B:
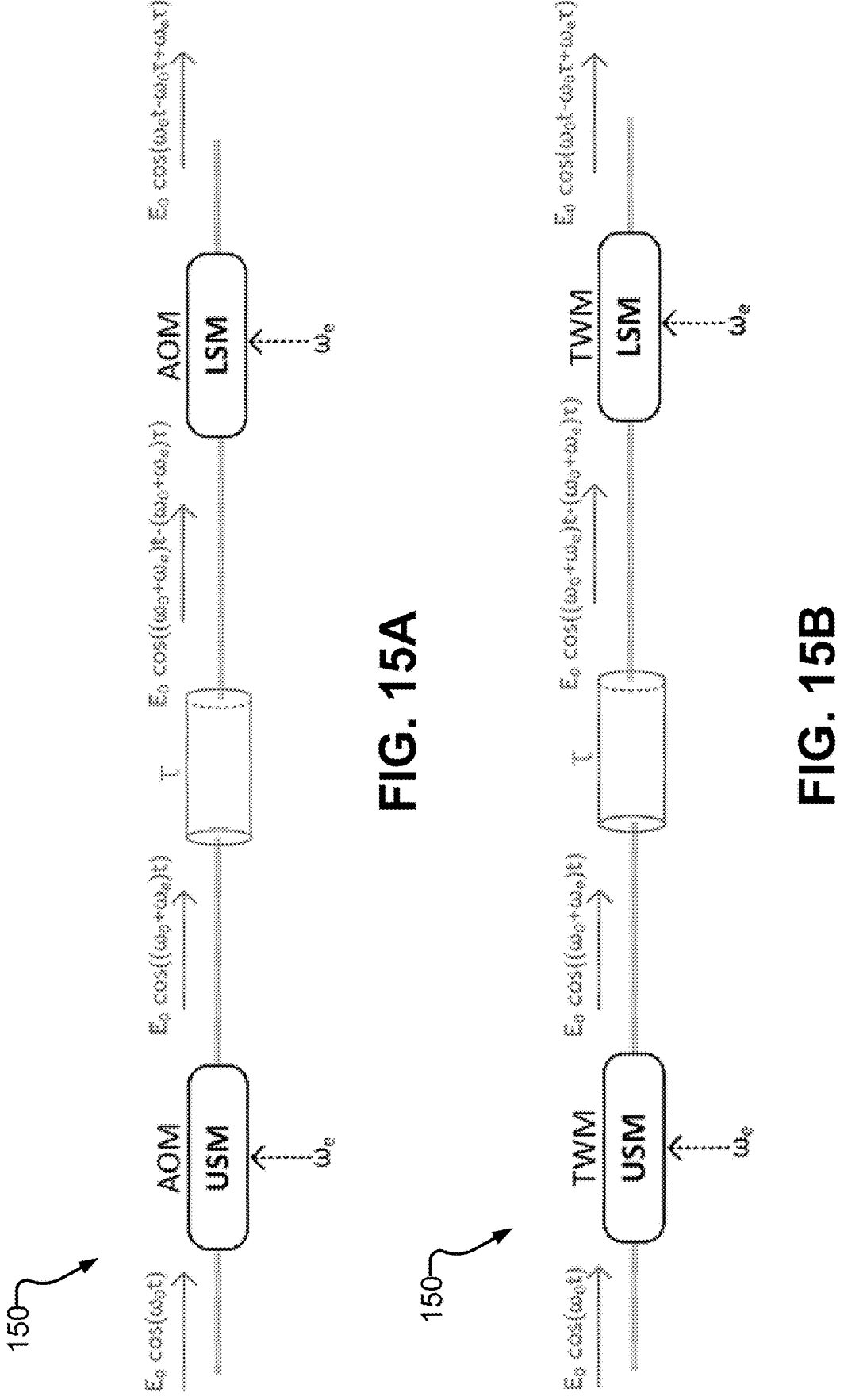
FIG. 15A is a schematic diagram of a large-range two-port reflection phase shifter implemented using single sideband (SSB) acousto-optical modulators (AOMs).
FIG. 15B is a schematic diagram of a large-range two-port reflection phase shifter implemented using single sideband (SSB) traveling wave modulators (TWM).

Referring to FIG. 15, an example of a large-range 2-port phase shifter is shown in FIG. 15A using single sideband (SSB) acousto-optical modulators (AOMs) and shown in FIG. 15B traveling wave modulators (TWM), respectively. The lower sideband modulator (LSM) and upper sideband modulator (USM), when operated by an electrical periodic signal of frequency $\omega_{dec}$, shifts the laser carrier frequency, $\omega_0$, to $\omega_0-\omega_e$ and $\omega_0+\omega_e$, respectively. The electric field amplitude and phase at difference points are shown as well. When the electrical periodic signal's frequency $\omega_e$ is swept over a large range using a voltage controlled oscillator (VCO), a variable and large range phase shift can be obtained without using a large voltage drive on a heater.

Figure 16:
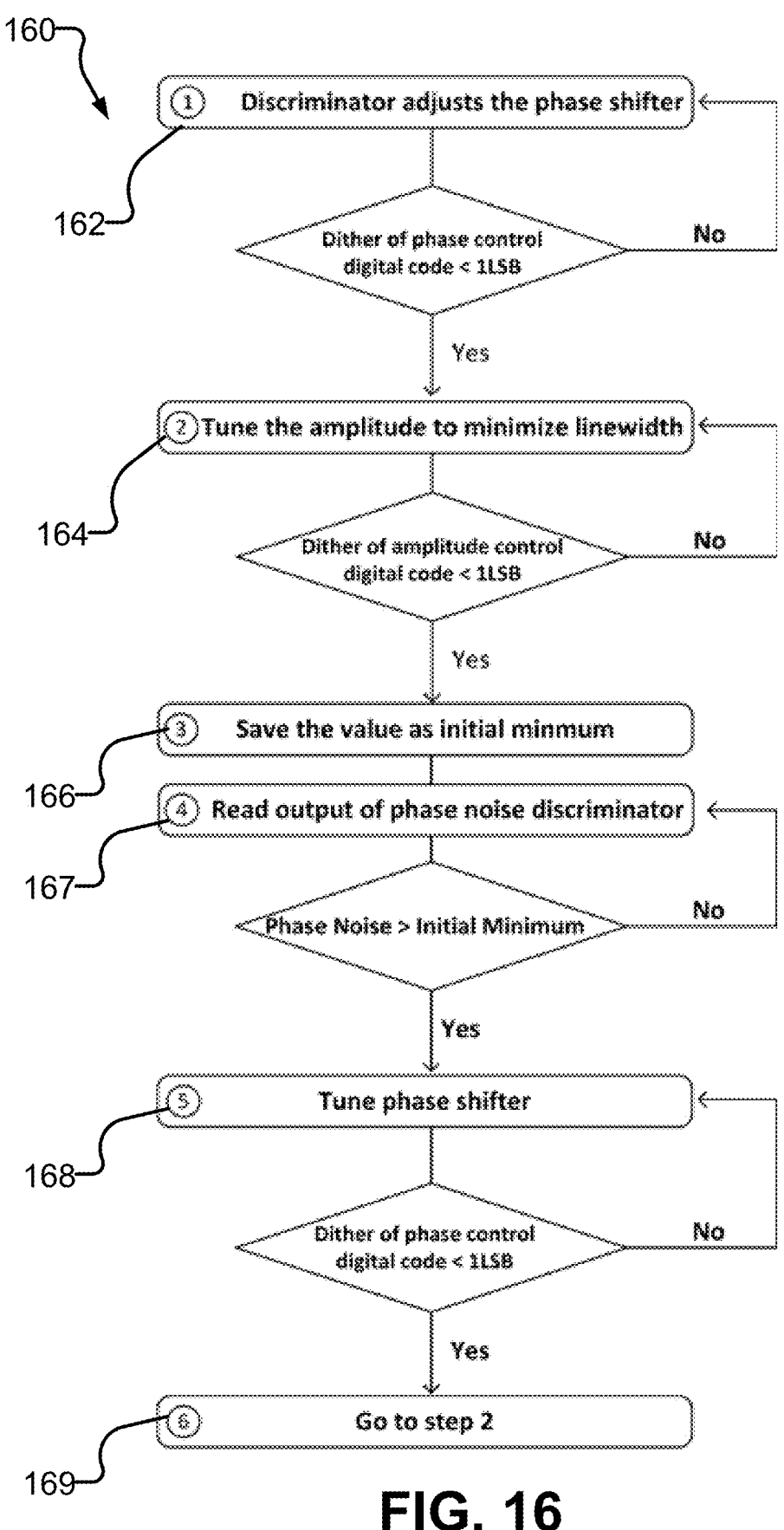
FIG. 16 is a flowchart illustrating an example linewidth reduction process.

FIG. 16 is a flowchart illustrating a process for producing light having a reduced spectral linewidth according to an example embodiment. At step 162, a phase of an optical feedback signal is adjusted to make the linewidth most sensitive to changes in the amplitude of the optical feedback signal. At step 164, the amplitude of the optical feedback signal is adjusted to achieve a minimum linewidth. Subsequently, the phase of the optical feedback signal is monitored and controlled to maintain the reduced linewidth.

At step 166, a measure of the linewidth is saved as an "initial minimum value" the corresponding phase and amplitude settings may also be saved as initial reference values.

At step 167 the linewidth is measured (e.g. by a frequency/phase noise discriminator). If the linewidth exceeds the initial minimum then at step 168 the phase of the optical feedback signal is tuned and at step 169 the amplitude of the optical feedback signal is adjusted to again minimize the linewidth.

Figure 17:
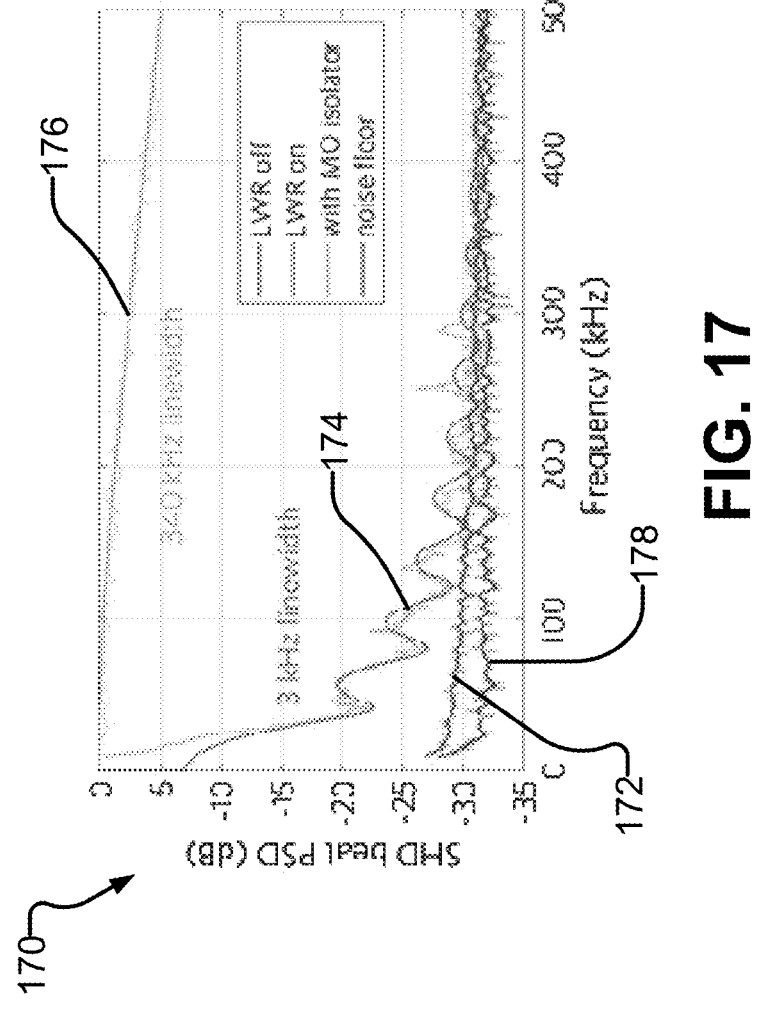
FIG. 17 is a graph showing the effect of a linewidth reduction system on laser linewidth over a spectrum of laser frequencies.

FIG. 17 is a graph 170 showing the effect of a linewidth reduction system as described herein on laser linewidth over a spectrum of laser frequencies. The vertical axis is a measure of "SHD beat PSF" indicating the linewidth of the laser with dB as units. The light lines are the measured spectra and the dark lines are curves that are fitted to the measurement results. Line 172 is the result when the linewidth reduction system is off. Line 174 is the result when the linewidth reduction system is on. Line 176 is the result obtained when using an optical isolator on the laser. Line 178 is the noise floor.

The linewidth of the laser was reduced to ~3 kHz with the linewidth reduction system on, compared to 340 kHz with the isolator. The linewidth of the laser measured with the isolator is also about 10% of the factory reported linewidth of the free-running laser of ~3 MHz, which is due to reflections from the fiber connectors and the fiber. This suggests that reflection to the laser improves the linewidth. It also means that by locking the linewidth reduction system to send back ~−44 dB of optical power to the laser, the free-running laser's linewidth was reduced by three orders of magnitude.

In some embodiments, electronic controls are implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

In some embodiments, electronic control 18 comprises a low noise trans-impedance amplifier (TIA), an analog-to-digital converter (ADC), a digital finite state machine, a digital-to-analog converter (DAC) and a driver to control the amplitude or phase. In another embodiment, the electronic control can be a completely analog PID controller with a low noise TIA, followed by analog PID control using amplifiers, voltage controlled oscillators acting as integrators, filters, and drivers. Other embodiments of the electronic control are possible.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

REFERENCES

1. Ohtsu, M. & Kotajima, S. Linewidth reduction of a semiconductor laser by electrical feedback, Journal of Quantum Electronics (1985).
2. Black, E. D. An introduction to Pound-Drever-Hall laser frequency stabilization, American Journal of Physics (2001).
3. Idjadi, M. & Aflatouni, F. Integrated Pound-Drever-Hall laser stabilization system in silicon, Nature Communication (2017).
4. Sivananthan, A. et al. Integrated linewidth reduction of a tunable SG-DBR laser, In Lasers and Electro-Optics, 2013. CLEO 2013. Conference on (IEEE, 2013).
5. Dahmani, B., Hollberg, L. & Drullinger, R. Frequency stabilization of semiconductor lasers by resonant optical feedback. Opt. Lett. 12, 876-878 (1987).
6. Aoyama, K., Yoshioka, R., Yokota, N., Kobayashi, W. & Yasaka, H. Optical negative feedback for linewidth reduction of semiconductor lasers. IEEE Photonics Technology Letters 27, 340-343 (2015).
7. Song, B. et al. Noise reduction of integrated laser source with on-chip optical feedback. In Asia Communications and Photonics Conference, M1D.5 (Optical Society of America, 2017).
8. Shin, C.-H. & Ohtsu, M. Stable semiconductor laser with a 7-Hz linewidth by an optical-electrical double-feedback technique. Opt. Lett. 15, 1455-1457 (1990).
9. Aflatouni, F., Bagheri, M. & Hashemi, H. Design methodology and architectures to reduce the semiconductor laser phase noise using electrical feedforward schemes. IEEE Transactions on Microwave Theory and Techniques 58, 3290-3303 (2010).
10. Aflatouni, F. et al. Integrated light source independent linewidth reduction (2013). US Patent 0322807.
11. Aflatouni, F. et al. Integrated light source independent linewidth reduction of lasers using electro-optical feedback techniques (2016). U.S. Pat. No. 9,250,453.
12. Doerr, C. Endless phase shifting (2013). US Patent 20130044974A1.
13. N. Schunk and K. Petermann. Numerical analysis of the feedback regimes for a single-mode semiconductor laser with external feedback. IEEE Journal of Quantum Electronics 24, 1242-1247 (1988).
14. Long-Sheng Ma, Peter Jungner, Jun Ye, and John L. Hall, "Delivering the same optical frequency at two places: accurate cancellation of phase noise introduced by an optical fiber or other time-varying path", Opt. Lett. 19, 1777-1779 (1994).

What is claimed is:

1. A coherent light source comprising:
a coherent light emitter operable to emit a beam of coherent light;
an optical feedback system comprising an integrated photonic circuit operative to redirect a fraction of the light of the beam of coherent light back into the coherent light emitter as an optical feedback signal; and,
an electronic control operative to set an amplitude and/or a phase of the redirected fraction of the light;
wherein the integrated photonic system comprises an optical phase shifter operative to apply a selected phase shift to the redirected fraction of the light wherein the selected phase shift is controlled by the electronic control;
wherein the optical phase shifter comprises:
an optical switch switchable between a first state where light presented at an input/output port is directed to a first port with a first phase delay and a second state where light presented at the input port is directed to a second port with a second phase delay; and
optics comprising a variable line phase shifter connected between the first and second ports.

2. The coherent light source according to claim 1 wherein the integrated photonic circuit comprises an optical attenuator and an attenuation provided by the optical attenuator is controlled by the electronic control.

3. The coherent light source according to claim 1 wherein the integrated photonic circuit comprises a reflector.

4. The coherent light source according to claim 1 wherein the optical feedback system comprises a splitter/combiner connected to receive the beam of coherent light from the light emitter, tap a portion of the beam of coherent light, deliver a remainder of the beam of light to an output port, and receive and redirect into the coherent light emitter the fraction of the light.

5. The coherent light source according to claim 4 wherein the splitter/combiner is a variable splitter/combiner and the electronic control is operative to vary the portion of the beam of light tapped by the splitter/combiner.

6. The coherent light source according to claim 4 comprising a variable optical phase shifter between the splitter/combiner and the coherent light emitter, the variable optical phase shifter operative to apply a selected phase shift to the redirected fraction of the light wherein the selected phase shift is controlled by the electronic control.

7. The coherent light source according to claim 1 wherein the optical phase shifter comprises a first optical coupler connecting the input/output port and the switch, a second 2×2 ports coupler connecting the switch and a line phase shifter section containing the line phase shifter and a third 2×2 ports coupler connecting the line phase shifter section and a waveguide loop.

8. The coherent light source according to claim 2 wherein the first optical coupler is a 2×2 ports coupler, the phase shifter comprises a photodetector connected to a port of the first optical coupler, and the electronic control is connected to monitor an output signal of the photodetector.

9. The coherent light source according to claim 8 wherein the optical switch comprises first and second phase shifters controlled by the electronic control and the electronic control is configured to control the first and second phase shifters to switch the switch between the first and second states.

10. The coherent light source according to claim 9 wherein the electronic control is configured to adjust the first and second phase shifters to minimize the photocurrent at the photodetector.

11. The coherent light source according to claim 1 comprising a photosensor coupled to measure an amplitude of the optical feedback signal.

12. The coherent light source according to claim 11 wherein the electronic control stores a desired amplitude for the optical feedback signal and is configured to control the integrated photonic circuit to cause the amplitude of the optical feedback signal to equal the desired amplitude for the optical feedback signal.

13. A coherent light source comprising:
a coherent light emitter operable to emit a beam of coherent light;
an optical feedback system comprising an integrated photonic circuit operative to redirect a fraction of the light of the beam of coherent light back into the coherent light emitter as an optical feedback signal; and,
an electronic control operative to set an amplitude and/or a phase of the redirected fraction of the light;
an optical filter connected to pass optical power in one or more sidebands of a spectrum of the coherent light to a photosensor wherein the electronic control is connected to receive an output signal from the photosensor that provides a measure of the optical power in the one or more sidebands of the spectrum of the coherent light.

14. The coherent light source according to claim 13 wherein the electronic control is configured to adjust the phase and/or amplitude of the optical feedback signal to minimize the optical power in the one or more sidebands of the spectrum of the coherent light.

15. A coherent light source comprising:
a coherent light emitter operable to emit a beam of coherent light;
an optical feedback system comprising an integrated photonic circuit operative to redirect a fraction of the light of the beam of coherent light back into the coherent light emitter as an optical feedback signal; and,
an electronic control operative to set an amplitude and/or a phase of the redirected fraction of the light;
a frequency/phase noise discriminator operable to measure optical phase fluctuations in the coherent light beam wherein the electronic control is configured to control the amplitude and/or the phase of the optical feedback signal to minimize the optical phase fluctuations.

16. A coherent light source comprising:
a coherent light emitter operable to emit a beam of coherent light;
an optical feedback system comprising an integrated photonic circuit operative to redirect a fraction of the light of the beam of coherent light back into the coherent light emitter as an optical feedback signal; and,
an electronic control operative to set an amplitude and/or a phase of the redirected fraction of the light;
wherein the coherent light emitter comprising a laser and the laser comprises a multi-wavelength laser operative to emit light of a plurality of different wavelengths, the optical feedback system is one of a plurality of optical feedback systems, each of the plurality of optical feedback systems configured to provide a corresponding optical feedback signal at a corresponding one of the plurality of wavelengths and the electronic control itself or in combination with one or more additional electronic controls is operative to set an amplitude and/or a phase of the optical feedback signals of each of the plurality of wavelengths.

17. The coherent light source according to claim 16 wherein each of the plurality of optical feedback systems comprises a bandpass filter having a passband at one of the plurality of wavelengths wherein the bandpass filter blocks other ones of the plurality of wavelengths.

18. A reflection endless phase shifter comprising:
at least one input/output port,
a first optical coupler connecting the at least one input/output port to first and second ports of a four port switch,
a line phase shifter section having first and second ports connected by a second optical coupler to third and fourth ports of the switch,
the line phase shifter section having third and fourth ports connected by a third optical coupler to first and second ports of a reflector
wherein:
the switch comprises a first arms extending from the first port of the switch to the third port of the switch and a second arm extending from the second port of the switch to the fourth port of the switch,
the first and second arms respectively comprise first and second switch phase shifters;
the switch has a first state in which the first and second phase shifters are controlled to provide a first relative phase of the first and second arms and a second state in which the first and second phase shifters are controlled to make provide a second relative phase of the first and second arms;

the line phase shifter section comprises at least one line phase shifter, the line phase shifter controllable to set a phase shift at least in the range of 0 and 2π radians.

\* \* \* \* \*